(12) United States Patent
Campos et al.

(10) Patent No.: US 10,397,672 B2
(45) Date of Patent: Aug. 27, 2019

(54) SYSTEMS AND METHODS FOR INTELLIGENT EDGE TO EDGE OPTICAL SYSTEM AND WAVELENGTH PROVISIONING

(71) Applicant: CABLE TELEVISION LABORATORIES, INC, Louisville, CO (US)

(72) Inventors: Luis Alberto Campos, Superior, CO (US); Zhensheng Jia, Superior, CO (US); Carmela Stuart, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/878,258

(22) Filed: Jan. 23, 2018

(65) Prior Publication Data
US 2018/0213305 A1    Jul. 26, 2018

Related U.S. Application Data

(63) Continuation-in-part of application No. 15/590,464, filed on May 9, 2017.
(Continued)

(51) Int. Cl.
*H04B 10/00* (2013.01)
*H04Q 11/00* (2006.01)
*H04J 14/02* (2006.01)

(52) U.S. Cl.
CPC ...... *H04Q 11/0005* (2013.01); *H04J 14/0242* (2013.01); *H04J 14/0257* (2013.01);
(Continued)

(58) Field of Classification Search
USPC ................................................... 398/66–73
See application file for complete search history.

(56) References Cited

U.S. PATENT DOCUMENTS

| | | | |
|---|---|---|---|
| 5,808,767 | A | 9/1998 | Williams et al. |
| 6,353,490 | B1 * | 3/2002 | Singer ............... H04B 10/271 |
| | | | 348/E7.07 |

(Continued)

FOREIGN PATENT DOCUMENTS

WO    2011139812 A1    11/2011

OTHER PUBLICATIONS

PCT International Search Report and Written Opinion for related Application No. PCT/US2017/038302, dated Oct. 6, 2017, 14 pps.
(Continued)

*Primary Examiner* — Agustin Bello
(74) *Attorney, Agent, or Firm* — Armstrong Teasdale LLP

(57) ABSTRACT

An optical access network includes an optical hub having at least one processor. The network further includes a plurality of optical distribution centers connected to the optical hub by a plurality of optical fiber segments, respectively, and a plurality of geographic fiber node serving areas. Each fiber node serving area of the plurality of fiber node serving areas includes at least one optical distribution center of the plurality of optical distribution centers. The network further includes a plurality of end points. Each end point of the plurality of end points is in operable communication with at least one optical distribution center. The network further includes a point-to-point network provisioning system configured to (i) evaluate each potential communication path over the plurality of optical fiber segments between a first end point and a second end point, and (ii) select an optimum fiber path based on predetermined path selection criteria.

20 Claims, 25 Drawing Sheets

Related U.S. Application Data

(60) Provisional application No. 62/352,279, filed on Jun. 20, 2016, provisional application No. 62/449,397, filed on Jan. 23, 2017.

(52) U.S. Cl.
CPC .. *H04J 14/0271* (2013.01); *H04Q 2011/0016* (2013.01); *H04Q 2011/0041* (2013.01); *H04Q 2011/0086* (2013.01)

(56) References Cited

U.S. PATENT DOCUMENTS

| | | | |
|---|---|---|---|
| 6,684,030 B1* | 1/2004 | Taylor | H04B 10/25751 398/59 |
| 7,016,308 B1 | 3/2006 | Gallagher | |
| 7,050,718 B2* | 5/2006 | Rychlicki | H04J 14/02 398/48 |
| 7,149,429 B2* | 12/2006 | Ufongene | H04L 14/0227 398/69 |
| 7,254,333 B2* | 8/2007 | Shimizu | H04J 14/0201 385/24 |
| 7,362,931 B2* | 4/2008 | Gall | H04B 10/272 385/24 |
| 7,536,705 B1 | 5/2009 | Boucher et al. | |
| 7,620,319 B2* | 11/2009 | Krimmel | H04B 10/071 398/13 |
| 8,369,704 B2* | 2/2013 | Bardalai | H04B 10/0773 398/25 |
| 8,406,636 B2* | 3/2013 | Zou | H04L 12/2861 398/140 |
| 8,811,820 B2* | 8/2014 | Dahlfort | H04L 41/5058 370/352 |
| 2004/0208559 A1 | 10/2004 | Krishnaswamy et al. | |
| 2004/0208572 A1 | 10/2004 | Schemmann et al. | |
| 2005/0135809 A1* | 6/2005 | Vishnubhatt | H04L 41/5054 398/66 |
| 2005/0138670 A1 | 6/2005 | Ploumen | |
| 2005/0213973 A1 | 9/2005 | Rohrer et al. | |
| 2009/0129778 A1 | 5/2009 | Phillips et al. | |
| 2010/0046947 A1* | 2/2010 | Farmer | H04J 14/0226 398/72 |
| 2010/0239257 A1 | 9/2010 | Grossman et al. | |
| 2011/0206368 A1* | 8/2011 | Bardalai | H04B 10/0773 398/25 |
| 2013/0089329 A1* | 4/2013 | Gerszberg | H04J 14/0278 398/59 |
| 2013/0266316 A1* | 10/2013 | Xia | H04J 14/0257 398/48 |
| 2014/0099112 A1* | 4/2014 | Tajima | H04L 41/145 398/66 |
| 2014/0219660 A1* | 8/2014 | Zhu | H04J 14/0282 398/67 |
| 2018/0213305 A1* | 7/2018 | Campos | H04J 14/0257 |

OTHER PUBLICATIONS

PCT International Search Report and Written Opinion for related Application No. PCT/US2018/014908, dated Apr. 20, 2018, 17 pps.

* cited by examiner

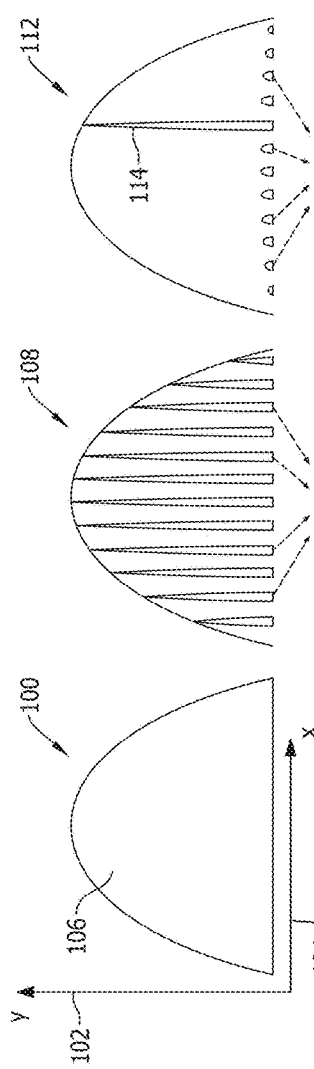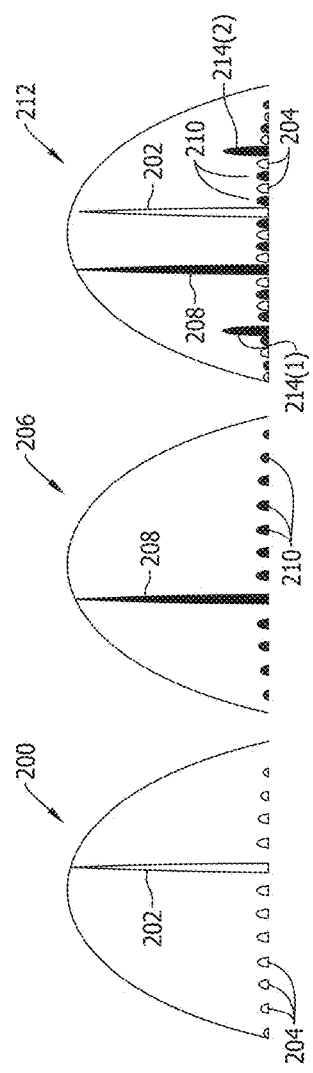

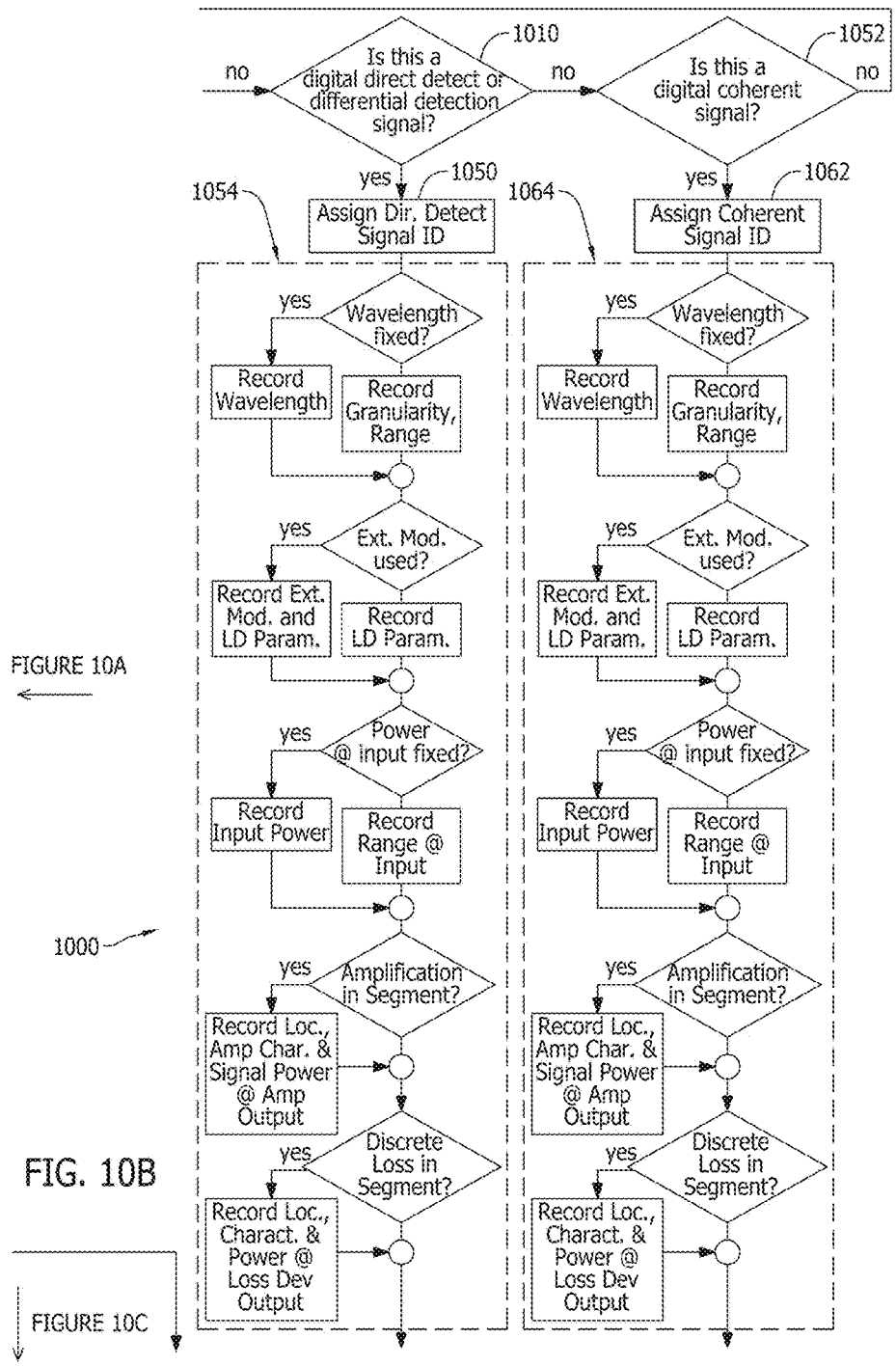

SYSTEMS AND METHODS FOR INTELLIGENT EDGE TO EDGE OPTICAL SYSTEM AND WAVELENGTH PROVISIONING

CROSS REFERENCE TO RELATED APPLICATIONS

This application claims the benefit of and priority to U.S. patent application Ser. No. 15/590,464 filed May 9, 2017, which claims the benefit of and priority to U.S. Provisional Patent Application Ser. No. 62/352,279, filed Jun. 20, 2016, both of which are incorporated herein by reference in their entireties. This application also claims the benefit of U.S. Provisional Patent Application Ser. No. 62/449,397, filed Jan. 23, 2017. The disclosures of all of these prior applications are incorporated herein by reference in their entireties.

BACKGROUND

The field of the disclosure relates generally to fiber communication networks, and more particularly, to optical access networks utilizing wavelength division multiplexing.

Telecommunications networks include an access network through which end user subscribers connect to a service provider. Some such networks utilize fiber-optic distribution infrastructures, which have historically provided sufficient availability of fiber strands such that dissimilar types of optical transport signals are carried over their own different fibers. Bandwidth requirements for delivering high-speed data and video services through the access network, however, is rapidly increasing to meet growing consumer demands. As this signal capacity demand continues to grow, the capacity of individual long access fiber strands is limited. The cost of installing new long access fibers is expensive, and dissimilar optical transport signals, unless they are purposely isolated, experience interference from one another on the same fiber strand. This legacy fiber environment requires operators to squeeze more capacity out of the existing fiber infrastructure to avoid costs associated with having to retrench new fiber installment.

Conventional access networks typically include six fibers per node, servicing as many as 500 end users, such as home subscribers, with two of the fibers being used for downstream and upstream residential transport, and the remaining used for node splitting or businesses services. Conventional nodes cannot be split further using conventional techniques, and do not typically contain spare (unused) fibers, and thus there is a need to utilize the limited fiber availability in a more efficient and cost-effective manner. Dense Wavelength Division Multiplexing (DWDM) environments, for example, are capable of multiplexing signals using similar optical transport techniques. In certain access network environments such as the cable television environment, DWDM is able to utilize different formats, but its fiber strand availability is still limited by conventional fiber-optic infrastructure costs and considerations. Cable access networks include analog modulation of the cable RF spectrum onto optical carriers, baseband digital modulation of an optical carrier supporting business services, and Ethernet passive optical network (EPON) and Gigabit passive optical network (GPON) systems carrying data for residential or business subscribers. Each of these different optical transport signals typically requires its own dedicated long fiber strands.

Coherent technology has been proposed as one solution to meet the ever increasing signal traffic demand for WDM-PON optical access networks, in both brown and green field deployments, particularly with respect to long and metropolitan links for achieving high spectral efficiency (SE) and higher data rates per channel. Coherent technology in long optical systems typically requires significant use of high quality discrete photonic and electronic components throughout the access network, such as digital-to-analog converters (DAC), analog-to-digital converters (ADC), and digital signal processing (DSP) circuitry such as an application-specific integrated circuit (ASIC) utilizing CMOS technology, to compensate for noise, drift, and other factors affecting the transmitted channel signals over the access network. Furthermore, as the number of end users per optical fiber increases, so does the cost, and power requirements, of implementing all of these electronic components for each terminal device in the network. Some known proposed coherent solutions have also required their own dedicated long fiber strands to avoid interference from dissimilar optical transport signals. Accordingly, a solution is desired that allows dissimilar transport signals to coexist on the same transmission fibers.

BRIEF SUMMARY

In an embodiment, an optical network communication system includes an optical hub, an optical distribution center, at least one fiber segment, and at least two end users. The optical hub includes an intelligent configuration unit configured to monitor and multiplex at least two different optical signals into a single multiplexed heterogeneous signal. The optical distribution center is configured to individually separate the least two different optical signals from the multiplexed heterogeneous signal. The at least one fiber segment connects the optical hub and the optical distribution center, and is configured to receive the multiplexed heterogeneous signal from the optical hub and distribute the multiplexed heterogeneous signal to the optical distribution center. The at least two end users each include a downstream receiver configured to receive one of the respective separated optical signals from the optical distribution center.

In an embodiment, a method of distributing heterogeneous wavelength signals over a fiber segment of an optical network is provided. The method includes the steps of monitoring at least two different optical carriers from at least two different transmitters, respectively, analyzing one or more characteristics of the fiber segment, determining one or more parameters of the at least two different optical carriers, and assigning a wavelength spectrum to each of the at least two different optical carriers according to the one or more analyzed fiber segment characteristics and the one or more determined optical carrier parameters.

In an embodiment, an optical distribution center apparatus, includes an input optical interface for communication with an optical hub, an output optical interface for communication with one or more end user devices configured to process optical signals, a wavelength filter for separating a downstream heterogeneous optical signal from the input optical interface into a plurality of downstream homogenous optical signals, and a downstream optical switch for distributing the plurality of downstream homogeneous optical signals from the wavelength filter to the output optical interface in response to a first control signal from the optical hub.

In an embodiment, an optical access network includes an optical hub having at least one processor. The network further includes a plurality of optical distribution centers connected to the optical hub by a plurality of optical fiber segments, respectively, and a plurality of geographic fiber node serving areas. Each fiber node serving area of the plurality of fiber node serving areas includes at least one optical distribution center of the plurality of optical distribution centers. The network further includes a plurality of end points. Each end point of the plurality of end points is in operable communication with at least one optical distribution center. The network further includes a point-to-point network provisioning system configured to (i) evaluate each potential communication path over the plurality of optical fiber segments between a first end point and a second end point, and (ii) select an optimum fiber path based on predetermined path selection criteria.

In an embodiment, a method of provisioning point-to-point communications between two end points of a multi-end point optical network is provided. The method includes steps of indexing all end points of the optical network, defining each potential point-to-point connection between the indexed end points, and determining a topological fiber path for each defined point-to-point connection. Each topological fiber path includes one or more optical fiber segments. The method further includes steps of calculating available transmission wavelengths for each of the one or more fiber segments, selecting an optimum fiber path between the two end points based on the determined topological fiber path and the calculated available transmission wavelengths, and provisioning a point-to-point communication link between the two end points along the selected optimum fiber path.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1A-1C illustrate input signal emission spectra that can be utilized with fiber communication systems in accordance with an exemplary embodiment of the present disclosure.

FIGS. 2A-2C illustrate interaction of multiple signals from different longitudinal modes according to the exemplary emission spectrum depicted in FIG. 1C.

FIGS. 10A-C illustrate a flow chart diagram of an exemplary signal analysis process that can be implemented with the allocation process depicted in FIG. 8.

Figure 3:
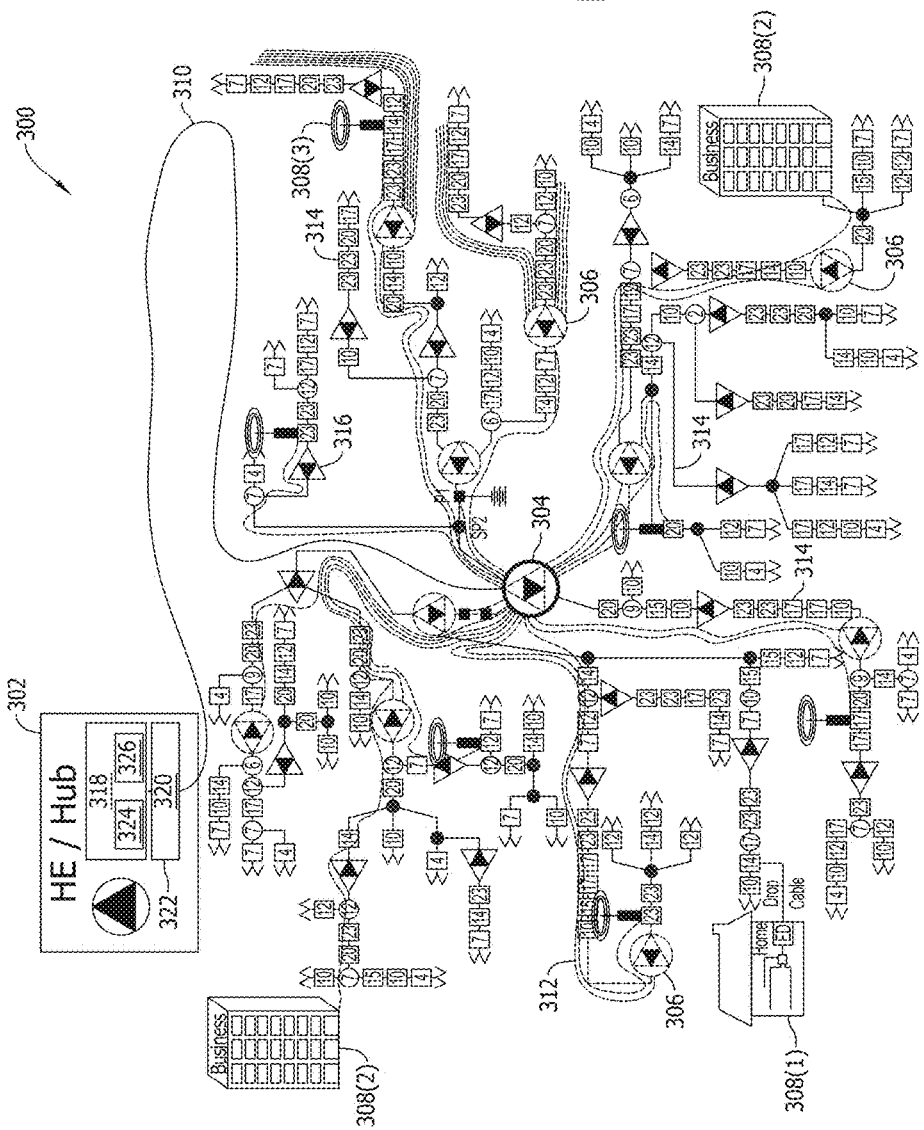
FIG. 3 is a schematic illustration of an exemplary fiber communication system in accordance with an embodiment of the present disclosure.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

According to the embodiments herein, an optical distribution system is capable of optimally carrying and multiplexing a plurality of heterogeneous optical transport signals. The present embodiments may further be advantageously implemented with both new and legacy distribution networks so significantly improve both capacity and performance of such systems.

Optical signals consume different amounts of fiber resources depending on their respective power levels, modulation formats, and wavelength they occupy in relation to wavelengths and characteristics of neighboring signals, symbols and/or bandwidths, among other parameters. The systems described herein implement hardware and algorithms to aggregate and configure multiple different optical signals within the same optical fiber. The embodiments herein further utilize disclosure also introduces relations between performance metrics, optical signal configuration parameters and fiber capability for carrying these optical signals.

FIGS. 1A-1C illustrate approximate signal emission spectra that can be utilized with fiber communication systems in accordance with an exemplary embodiment of the present disclosure. Referring now to FIG. 1A, an emission spectrum 100 for an LED (Light Emitting Diode, not shown) is illustrated. Emission spectrum 100 represents power 102 (y-axis) against wavelength 104 (x-axis) for emitted light 106. Laser diodes are implemented from a semiconductor junction operated in forward bias mode. Electrons in that junction transition from a higher to a lower energy state. In such a process, a photon that has an energy equal to the difference in energy states of the electron is emitted, which represents the spontaneous emission of light present in an LED, as illustrated in FIG. 1A.

Referring now to FIG. 1B, an emission spectrum 108 is illustrated for a laser diode such as a Fabry Perot laser diode (FPLD) or a vertical-cavity surface-emitting laser (VCSEL). Such laser diodes may also implement reflective facets or mirrors so that generated photons bounce back and forth stimulating, along their path, the emission of more photons. This stimulated emission, or lasing, results in light emission at higher intensity levels and with a high degree of coherence. The mirror or facets on opposite sides of the active region formed by the junction create an optical cavity. The geometry of that cavity along with the range in energy levels generated by the change of state in the junction will determine one or more dominant resonant wavelengths transmitted by the laser diode.

In an exemplary embodiment, an FPLD may have an optical bandwidth of 5 to 10 nanometers (nm), and generate a plurality of individual longitudinal modes 110, each having an output bandwidth typically less than 2 nm. In an embodiment, an 850 nm laser diode with a length of around 300 micrometers (μm) and a refractive index of approximately 4 may have a longitudinal mode spacing of 0.3 nm, which is similar to a 1 mm long 1550 nm laser diode. Changing the length or refractive index of the cavity, for example by heating or cooling the laser diode, may shift the whole comb of modes and consequently the output wavelength.

Referring now to FIG. 1C, an emission spectrum 112 is illustrated for a laser diode such as a distributed feedback laser diode (DFBLD). In an optical signal source, the dominant lasing wavelength is dependent on the material which provides a broad wavelength range that generates light based on the band-gap between electron states of a semiconductor junction, as well as the length of the cavity which results in a multitude of resonant modes that restricts the wavelengths. The dominant lasing wavelength is further dependent on structural characteristics of the cavity that further restrict resonance to a single longitudinal mode 114, while suppressing adjacent longitudinal modes 116. A DFBLD, through a periodic index of refraction variation, is capable of thus limiting resonance substantially to a single wavelength, i.e., longitudinal mode 114, as illustrated in FIG. 1C.

According to the embodiments described herein, and further below, sources include LEDs, FPLDs, VCSELs, and DFBLDs. One of ordinary skill in the art though, after reading and comprehending the present disclosure, will understand that other sources may be implemented without departing from the scope of the application. The sources described herein are capable of converting electrical signals into optical signals, and can be significantly different devices structurally. In an exemplary embodiment, the lasing source can be manufactured on semiconductor devices/chips. LEDs and VCSELs, for example, may be fabricated on semiconductor wafers such that light is emitted from the surface of the chip. FPLDs may be fabricated such that light is emitted from the side of the chip from a laser cavity created in the middle of the chip.

LEDs are the least expensive source, but produce lower power outputs than most of the other optical sources. LEDs also produce a larger, diverging light output pattern (see FIG. 1A, above), which reduces the applications available to couple LEDs into fibers. LEDs and VCSELs though, are generally inexpensive to manufacture in comparison with the other sources described herein. FPLDs and DFBLDs, for example, are more expensive to manufacture due to the necessity of creating the laser cavity inside the device, however, the output light from such sources are narrower and more easily coupled to single mode fibers.

DFBLDs have narrower spectral width than FPLDs, which realizes less chromatic dispersion on longer fiber links. DFBLDs are more expensive to manufacture than FPLDs, but also produce a more highly linear output, that is, the light output directly follows the electrical input, and may be preferable as sources in AM CATV systems and long distance and DWDM systems. According to the embodiments described below, many of these sources can be utilized alternatively and/or together according to the advantageous structural configurations described below.

FIGS. 2A-2C illustrate interaction of multiple signals from different longitudinal modes according to the exemplary emission spectrum depicted in FIG. 1C. In a fiber optic distribution system, there are many potential sources for non-linear behavior. One known source of non-linear behavior is an optical amplifier, such as an erbium-doped fiber amplifier (EDFA). However, even when no amplifiers are present, fiber non-linearities can also impact performance, such as from cross-phase modulation (CPM), self-phase modulation (SPM), and/or four-wave mixing (FWM) which originate when the index of refraction changes with optical power.

Referring now to FIG. 2A, an emission spectrum 200 is illustrated for a first signal source (not shown) generating a first dominant longitudinal mode 202, and suppressing first adjacent longitudinal modes 204. FIG. 2B, illustrates an emission spectrum 206 is illustrated for a second signal source (not shown) generating a second dominant longitudinal mode 208, and suppressing second adjacent longitudinal modes 210. In an exemplary embodiment, first and second signal sources are heterogeneous with respect to one another. FIG. 2C represents the superposition emission spectrum 212 of first and second signal sources together.

Referring now to FIG. 2C, one type of a non-linear effect is illustrated to depict intermodulation between adjacent carriers. In this example, first dominant longitudinal mode 202 and second dominant longitudinal mode 208, along with their respective suppressed first adjacent longitudinal modes 204 and second adjacent longitudinal modes 210, are spaced apart along the wavelength spectrum, such as may occur with first and second signals are intermodulated over the same fiber. In this example, the simultaneous transmission of the two signals on the same fiber produces noise artifacts 214 within the spectra of adjacent longitudinal modes 204, 210. Noise artifacts 214(1) and 214(2) include non-linear components resulting from the interference of the first and second signals. Noise artifacts 214 are more difficult to manage where the first and second signals are heterogeneous and not filtered.

Additionally, as different parameters, such as temperature, current, modulation bandwidth, and others change, the lasing wavelength of the respective signal may shift, or a different lasing mode may become dominant, thereby further increasing the likelihood and significance of noise artifacts 214 in operation. For these reasons, conventional systems do not transmit heterogeneous signals over the same fibers. According to the systems and methods disclosed herein, on the other hand, a plurality of heterogeneous optical signals, carried over different wavelengths, are transmitted through a single fiber, by managing and mitigating the interference problems that would be otherwise experienced by conventional communication networks.

FIG. 3 is a schematic illustration of an exemplary fiber communication system 300 implementing the principles described above with respect to FIGS. 1 and 2. System 300 includes an optical hub 302, an optical distribution center (ODC) 304, deep nodes 306, and end users 308. End users 308 are one or more downstream termination units, which can be, for example, a customer device or customer premises 308(1) (e.g., a home, apartment building, or residential radio frequency over glass (RFoG) subscribers), a business user 308(2) (including point to multipoint fiber networks with business EPON subscribers), an optical network unit (ONU, not shown), or a cellular base station 308(3) (including small cell base stations). Optical hub 302 is, for example, a central office, a communications hub, or an optical line terminal (OLT). In an exemplary embodiment, system 100 utilizes a passive optical network (PON) and coherent Dense Wavelength Division Multiplexing (DWDM) PON architecture. ODC 304 may be separate from deep nodes 306, or may include a hybrid architecture (see FIG. 12) that includes at least one deep node within the same ODC apparatus structure.

Optical hub 302 communicates with optical distribution center 304 by way of long fiber 310. In an exemplary embodiment, long fiber 310 is typically around 30 kilometers (km) in length, but may vary, as described below. However, according to the embodiments presented herein, greater lengths are contemplated, such as between 100 km and 300 km, and up to 1000 km. Optionally, long fiber 310 may be two separate fibers separately dedicated to downstream and upstream communication, respectively.

In an exemplary embodiment, optical distribution center 304 connects with end users 308 directly through short fibers 312, coaxial cable 314, and/or indirectly through intervening deep nodes 306. Signal power over coaxial cable 314 may be boosted by amplifiers 316 located along the cable path. In an exemplary embodiment, an individual short fiber 312 spans a distance typically less than 5000 feet.

In this example, fiber communication system 300 represents a cable access network, which may span distances ranging from 5 km to 140 km. Over this range, signal behaviors that depend on the time of interaction (common distance) are a consideration. Such behaviors may include fiber non-linear effects, dispersion, among others. Typical access networks may split a single fiber into many subpaths, which can result in a significant power loss (e.g., up to 18 decibel (dB) loss for a 32-way split) along the subpaths. The low robustness signal characteristic can further render some signal types more susceptible to noise generated by adjacent signals, as well as optical carriers exhibiting higher power.

To address these issues, optical hub 302 further includes an intelligent configuration unit 318 and at least one transmitter 320. Optionally, where upstream communication is desired, optical hub 302 further includes at least one receiver 322. Intelligent configuration unit 318 further includes a processor 324 and a signal multiplexer 326. As described further below with respect to FIGS. 6-11, processor 324 functions to analyze and aggregate a plurality of heterogeneous optical signals along an optimum spectrum distribution for transmission by multiplexer 326 over the same long fiber 310.

Intelligent configuration unit 318 operates to analyze (i.e., by processor 324) and aggregate (i.e., by multiplexer 326) a plurality of heterogeneous signals by measuring and controlling one or more of the following parameters: signal wavelength; optical power; modulation format; modulation bandwidth; polarization multiplexing; channel coding/decoding, including forward error correction, and fiber length. Intelligent configuration unit 318 is thus able to maximize the capacity of long fiber 310 to transmit multiple heterogeneous signals to ODC 304, where the multiplexed heterogeneous signals can be demultiplexed and separately transmitted to individual hybrid fiber-coaxial (HFC) optical nodes, such as deep nodes 306, to an expanding number of end points within the existing HFC node serving area of system 300. In an exemplary embodiment, these end points may include additional deep nodes 306 in succession, or cascade, along particular additional signal transmission paths that have been generated through successive node splitting in response to capacity shortage.

According to the embodiments herein, optical transmission of heterogeneous signals over existing optical fiber networks significantly improves the capacity of existing fibers that only transmit a single optical signal. Optical fibers that carry only one optical signal have few parameters to consider in optimizing performance for that particular transmission, since there is generally no interaction with other optical signals. For single optical signal transmission, considerations for performance optimization are dependent only on the limitations that the signal generates onto itself, as well as linear and non-linear factors of the optical transmission medium.

The simultaneous transmission of multiple heterogeneous optical signals, on the other hand, addresses a variety of different modulation formats and configuration parameters among the several signals. The present optimization scheme additionally selects configuration parameters based on the performance dependencies that exist between the different optical signals, as well as the fiber medium they share.

Intelligent configuration unit 318 functions to multiplex a plurality of heterogeneous optical signals together according to specific criteria to optimize quality of signal transmission while minimizing interference between optical signals of different types. Intelligent configuration unit 318 analyzes incoming optical signals of different types (e.g., analog, direct, coherent, etc.) using processor 324, and multiplexes the signals together utilizing signal multiplexer 326 so that the different signals may coexist over the length of long fiber 310 without substantially interfering with each other. Intelligent configuration unit 318 works cooperatively with ODC 304 such that ODC 304 may demultiplex the heterogeneous signal types from one another to be separately transmitted over short fibers 312 to particular end users 308 capable of receiving that type of signal, as illustrated below with respect to FIGS. 4 and 5.

In an exemplary embodiment, ODC 304 functions as a one-stage optical filter to separate the input multiplexed heterogeneous signals from intelligent configuration unit 318, over long fiber 310, into output separate homogeneous signal types over short fibers 312. In this embodiment, ODC 304 performs as a pure optical-in/optical-out filter. In an alternative embodiment, ODC 304 is additionally capable of converting one or more output homogeneous signals into an electrical signal transmitted over cable 314. Where deep nodes 306 are implemented along the signal path, a homogenous signal of a particular carrier type can be filtered by a particular deep node 306 to output a particular bandwidth for continued transmission to a particular end user 308. Alternatively, fiber deployed from ODC 304 may include direct express fiber runs to each, or some, of end users 308.

ODC 304 and cascading deep nodes 306 thus a function together as a flexible spectrum filter, with deep nodes 306 tailored to the particular bandwidth desired. In contrast, conventional filtering techniques are known to drop or add wavelengths onto a fiber loop. The wavelength- and fiber-sharing techniques disclosed herein may thus result in cost-effective implementations to reach the end user. Variations and evolved implementations of EPON and GPON systems are also compatible with the systems and methods disclosed herein. By this advantageous configuration, multiple signals different carrier types effectively "re-use" the same long fiber that would be conventionally dedicated to only one single signal type, thus eliminating the need to retrench new fibers for the different signal types.

Figure 4:
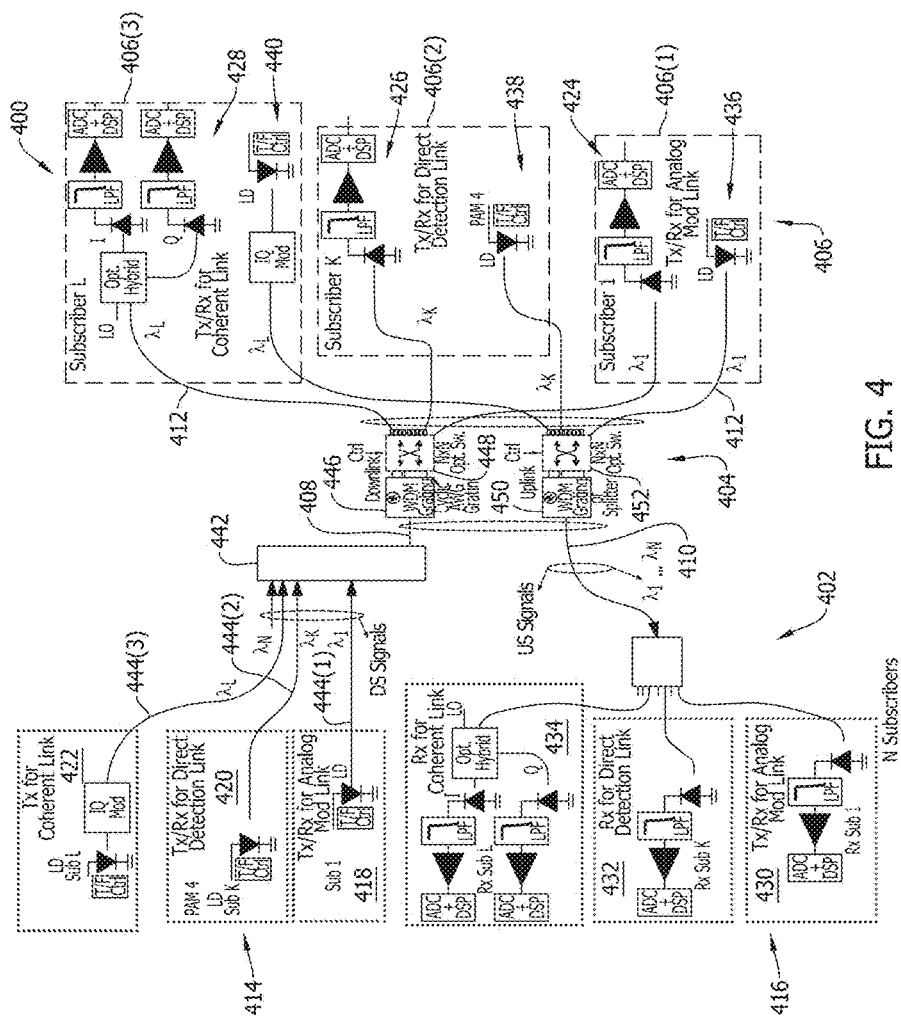
FIG. 4 is a schematic illustration of an exemplary fiber communication system in accordance with an embodiment of the present disclosure.
Figure 5:
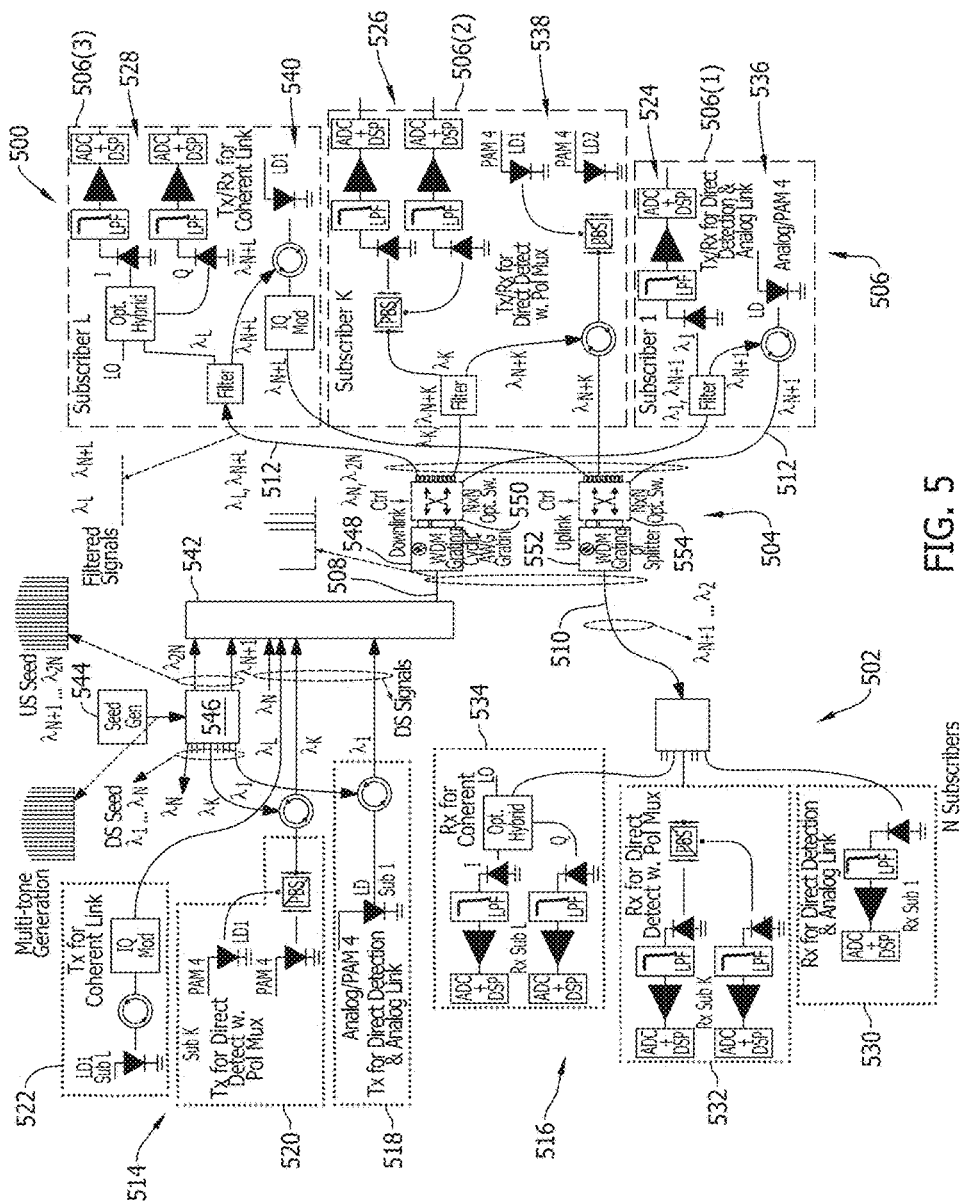
FIG. 5 is a schematic illustration of an alternative fiber communication system to the embodiment depicted in FIG. 4.

FIGS. 4 and 5 illustrate alternative system implementations to employ the principles described above with respect to FIG. 3. The alternative system implementations both are configured to aggregate heterogeneous optical signals within at least one long fiber each for downstream and upstream transmission, thereby leveraging the fibers presently available in the optical access environment of cable networks. If more efficient fiber utilization is desired, downstream and upstream transmissions may be both placed on a single fiber, through utilization of the wavelength control and management capabilities of intelligent configuration unit 318. However, in such instances, the amount of wavelength spectrum per direction (upstream or downstream) would be reduced in half. In an exemplary embodiment, optical circulators are employed at both ends of the fiber link (e.g., systems 300, 400, 500) to further enable this bidirectional alternative approach over a single fiber. Accordingly, both alternative systems shown in FIGS. 4 and 5, respectively, may be maintained such that they are kept substantially free of optical beat interference (OBI free).

In the exemplary alternatives shown in FIGS. 4 and 5, both systems are illustrated to implement cable fiber distribution networks. Nevertheless, a person of ordinary skill in the art, after reading and comprehending the written description herein and its accompanying drawings, will understand to be able to apply the principles and techniques so disclosed to other types of optical distribution networks, such as cellular distribution networks, digital subscriber line (DSL) based distribution networks, and others.

Referring now to FIG. 4, a schematic illustration of an exemplary fiber communication system 400 is shown. System 400 is capable of leveraging wavelength tuning capabilities of multiple optical sources. Similar to system 300, above, system 400 includes an optical hub 402, an ODC 404, and end users 406. Optical hub 402 communicates with ODC 404 through downstream long fiber 408 and optional upstream long fiber 410. ODC 404 communicates with end users 406 through short fibers 412. For simplification of explanation, deep nodes and cable are not shown, but may be implemented along the signal path of short fibers 412 in a similar manner to the embodiments described above with respect to FIG. 3.

Optical hub 402 includes a downstream transmitting portion 414 and an optional upstream receiving portion 416. In an exemplary embodiment, downstream transmitting portion 414 includes at least two of an analog downstream transmitter 418, an intensity modulated direct detection (IM-DD) downstream transmitter 420, and a coherent downstream transmitter 422. End users 406 are comparable to end users 308 (FIG. 3), and may, for example, include one or more downstream termination units. In the exemplary embodiment, end users 406 include at least two of an analog downstream receiver 424, an IM-DD downstream receiver 426, and a coherent downstream receiver 428.

Where upstream communication is optionally desired (i.e., through upstream long fiber 410), upstream receiving portion 416 includes at least two of an analog upstream receiver 430, an IM-DD upstream receiver 432, and a coherent upstream receiver 434. In this exemplary embodiment, end users 406 include at least two of an analog upstream transmitter 436, an IM-DD upstream transmitter 438, and a coherent upstream transmitter 440.

In operation, optical hub 402 further includes an intelligent configuration unit 442, comparable to intelligent configuration unit 318 (FIG. 3), which analyzes incoming optical signals 444 of different types (e.g., analog optical signal 444(1), IM-DD optical signal 444(2), coherent optical signal 444(3), etc.) and multiplexes the incoming optical signals 444 together so that the different signals may coexist over the length of long fiber 408 without substantially interfering with each other. Intelligent configuration unit 442 works cooperatively with ODC 404 such that ODC 404 may demultiplex the heterogeneous signal types from one another to be separately transmitted over short fibers 412 to particular end users 406 capable of receiving that type of signal. For example, analog optical signal 444(1) is received by analog downstream receiver 424 of end user 406(1), IM-DD optical signal 444(2) is received by IM-DD downstream receiver 426 of end user 406(2), and coherent optical signal 444(3) is received by coherent downstream receiver 428 of end user 406(3).

In the exemplary embodiment, intelligent configuration unit 442 is a single intelligent device that also functions to multiplex, aggregate, and combine incoming optical signals 444. In an alternative embodiment, the multiplexing, aggregating, and combining functions may be performed by separate, passive devices (not shown). According to another alternative, such separate devices include sufficient intelligence functionality such that they are subject to some level of control and management by intelligent configuration unit 446. In some embodiments, intelligent configuration unit 446 is a standalone device that manages and controls separate devices that function to monitor and manipulate signals, including, for example, lasers that can be configured to used specific channels and operate with certain conditions to coexist and/or improve system performance. Some of such separate devices may be controlled directly by intelligent configuration unit 446, which, in this example, further includes control and communication interfaces (not shown) to extract and send information to the separate devices that enable the direct manipulation of incoming optical signals 444. Such separate devices are alternatively controlled by indirect communication with intelligent configuration unit 444, for example, through a control channel (not shown). In some embodiments, intelligent configuration unit 446 is combined with separate multiplexers, aggregators, and/or combiners in an integrated structure.

In an exemplary embodiment, ODC 404 includes a wavelength filter 446, which is implemented for downstream transmission to efficiently transition from the single fiber-multiple wavelength medium (i.e., downstream long fiber 408) between optical hub 402 and ODC 404, to the multiple fiber/single wavelength per fiber environment (i.e., short fibers 412) between ODC 404 and the respective termination devices of end users 406. Wavelength filter 446 may include, for example, a wavelength-division multiplexing (WDM) grating, and/or a cyclic arrayed waveguide grating (AWG). In the exemplary embodiment, ODC 404 further includes a downstream optical switch 448, which utilizes a control signal from intelligent configuration unit 442 to transmit the output from wavelength filter 446 along downstream short fibers 412. Where upstream transmission is optionally desired, ODC 404 further includes an optical combiner 450 to aggregate signals from the many upstream short fibers coming from the optical end devices of end users 406, to a single fiber (i.e., upstream long fiber 410) at ODC 404. Optical combiner 450 may include a WDM grating or splitter. In this configuration, ODC 404 further may include an upstream optical switch 452 between short fibers 412 and optical combiner 450, which together function to combine the different upstream optical carrier into a single upstream heterogeneous wavelength multiplexed signal, in coordination with the wavelength spacing and tuning processes of intelligent configuration unit 442, described further below. This aggregate upstream heterogeneous signal is carried over upstream long fiber 410 from ODC 404 to optical hub 402.

In an exemplary embodiment, data streams within optical hub 402 are associated for the purpose of reception/transmission from/to the different optical downstream transmitters 418, 420, 422 and upstream receivers 430, 432, 434, which are in communication with or connected to specific ODCs throughout the area optical hub 402 serves (see also FIG. 3, above). In this embodiment, intelligent configuration unit 442 is configured to utilize the known capability and configuration of wavelength filter 446 (WDM grating or demultiplexer) to further configure optical signal parameters, such as wavelength, bandwidth, modulation type, etc., of downstream transmitters 418, 420, 422, in order to reach specific target subscribers (i.e., end users 406).

In an alternative embodiment, downstream optical switch 448 is optionally an N×N optical switch, and intelligent configuration unit 442 is further configured to transmit control messages to downstream optical switch 448 to associate specific ports (not shown) with specific performance characteristics and signal types to target subscribers, thereby providing significant flexibility in the type of service and wavelength system 400 can dedicate to a particular target subscriber. In an alternative embodiment, where cost considerations are of greater concern, the N×N switch may be sized such that it covers only particular subscribers (e.g., a business) that require greater flexibility in adjusting parameters. Residential subscribers, for example, may be fixed to a specific wavelength assignment and service configuration.

In this embodiment, for the reverse transmission direction, upstream signal flow is controlled by intelligent configuration unit 442 so that the appropriate wavelength is routed to the appropriate receiver type (e.g., upstream receivers 430, 432, 434) in optical hub 402. In contrast, conventional optical nodes each serve only one signal type, and may not further function to manipulating or route signal traffic based on wavelength or signal type. For such conventional nodes, the characteristics of the transmitted signal are typically fixed based on the intended service. Accordingly, the signal processing in the upstream direction is substantially equivalent to the signal processing in the downstream direction, but in reverse. For example, for each command ODC 402 receives from intelligent configuration unit 442 for downstream transmission, intelligent configuration unit 442 may generate a counterpart command intended for upstream transmission. In an optional embodiment, upstream transmission aggregates channels utilizing a passive combiner (not shown) instead of a wavelength multiplexer.

In an exemplary embodiment, fiber communication system 400 may be further configured to include and implement an optical frequency comb generator (not shown) for generating at least one coherent tone pair for each coherent optical signals 444(3), which is then multiplexed within intelligent configuration unit 442, or by a separate device (described above) in communication with intelligent configuration unit 442, prior to transmission over downstream long fiber 408 to ODC 404. This exemplary architecture and processing are described in greater detail in co-pending U.S. patent application Ser. No. 15/283,632, filed Oct. 3, 2016, which is incorporated by reference herein.

Implementation of the embodiments described herein is useful for migrating hybrid fiber-coaxial (HFC) architectures towards other types of fiber architectures, as well as deeper fiber architectures. Typical HFC architectures tend to have very few fiber strands available from ODC to hub (e.g. fibers 408, 410), but many fiber strands could be deployed to cover the shorter distances that are typical from legacy HFC nodes to end users (e.g., fiber optics 412). In the exemplary embodiments described herein, two fibers (i.e., fibers 408, 410) are illustrated between optical hub 402 and ODC 404, which can include one or more legacy HFC fiber nodes. That is, one fiber (i.e., downstream fiber 408) is utilized for downstream signal, and another fiber (i.e., upstream fiber 410) is utilized for upstream signal. By utilization of the advantageous configurations herein, fiber deeper or all-fiber migration schemes can greatly minimize the need for fiber retrenching from an ODC or an HFC node to an optical hub. As described above, although two fibers (i.e., fibers 408, 410) are illustrated in FIG. 4, the present systems and methods may also be implemented utilizing only a single fiber, with the utilization of additional optical circulators and wavelength management, for example as described further below.

Whereas the conventional fiber access network architecture transmits only analog signals through the conventional mode, the advantageous architecture disclosed herein, through implementation of an intelligent configuration unit and an ODC, is capable of additionally transmitting direct and coherent optical signals simultaneously over the same long fiber based on available signal bandwidth occupancy, as disclosed further below with respect to FIGS. 6-10. This novel architecture and processing method is therefore particularly optimized for a cable environment desiring to reuse long fibers from a hub to a node. The embodiments described herein may also be adapted to a remote PHY solution, a remote cable modem termination system (CMTS) that is included in the fiber node, a coherent and non-coherent DWDM-PON architecture, a non-coherent IM-DD architecture, and/or intradyne, homodyne, and heterodyne coherent detection schemes in a long system.

In an exemplary embodiment, fiber communication system 400 is configured to further implement wavelength tuning and selectable fixed wavelengths. Specifically, the various optical sources that become optical signals 444 will optimally have either the capability of wavelength tuning, or for fixed optical wavelength sources, the sources can be selected such that the sources may be implemented according to the allocation and optimization criteria described herein. As discussed above, conventional networks typically have few spare fibers between the optical hub and the legacy node. Accordingly, one fiber is presumed to be available for transmission in the downstream direction, and one fiber is presumed to be available in the upstream direction, both typically covering tens of kilometers distance from hub to node. The requirement to use only a single fiber for each of downstream and upstream transmission does not permit fiber retrenching between the hub and the node. According to the novel systems and methods disclosed herein, however, new fiber installation need only be implemented over the significantly shorter distances (e.g., short fibers 412) between the ODC, legacy HFC fiber nodes, deeper nodes, end devices at businesses, and/or base stations or homes (in case of fiber to the home architectures). Such new fiber extensions would typically span no more than a few thousand meters. According to this novel architecture, a legacy HFC fiber node can be effectively converted into an ODC where many fiber segments originate towards these new optical termination devices or optical end devices.

In an exemplary embodiment, the access network fiber topology of system 400 implements signals from sources including, without limitation: analog modulated optical carriers such as the subcarrier multiplexed channels used in cable; baseband digital modulated signals using direct detection mechanisms such as non-return-to-zero (NRZ), return-to-zero (RZ), pulse amplitude modulation (PAM), including PAM4 and PAM8; differential detection signals such as differential phase-shift keying (DPSK) and differential quadrature phase-shift keying (D-QPSK); coherent modulated optical signals such as binary phase-shift keying (BPSK), quadrature phase-shift keying (QPSK) and higher order quadrature amplitude modulation (QAM); and polarization multiplexing transmission techniques for coherent modulation.

In further operation within the environment of fiber communication system 400, wavelengths of respective components are subject to change under different conditions. In some situations, where any two signal wavelengths get close enough to each other, a level of interference between the respective signals may increase. Where two such signal wavelengths lay on top of each other, optical beat interference may also be experienced. In an exemplary embodiment, laser diodes may be implemented, which are configured to have temperature control and/or frequency tuning control (T/F Ctrl) capabilities to maintain signal wavelengths such that they may be separated at specific desired spacing within certain tolerance values. According to an exemplary embodiment of fiber communication system 400, at least one laser diode is implemented for each respective transmitter and receiver within the network. In an embodiment, at least two long fibers (e.g., long fibers 408, 410) are required for N subscribers (e.g., end users 406) using N wavelengths. Alternatively, a single fiber could be used for N subscribers using 2N wavelengths, that is, N downstream wavelengths and N upstream wavelengths.

FIG. 5 is a schematic illustration of an alternative fiber communication system 500. Fiber communication system 500 is similar to fiber communication systems 300 (FIG. 3) and 400 (FIG. 4), except that fiber communication system 500 utilizes wavelength filtering and injection locking techniques, which are also described in greater detail in co-pending U.S. patent application Ser. No. 15/283,632, as discussed above. Fiber communication system 500 includes an optical hub 502, an ODC 504, and end users 506. Optical hub 502 communicates with ODC 504 through downstream long fiber 508 and upstream long fiber 510. ODC 504 communicates with end users 506 through short fibers 512. For simplification of explanation, deep nodes and cable (e.g., coaxial) are not shown, but may be implemented along the signal path of short fibers 512 similarly to the embodiments described above with respect to FIGS. 3 and 4.

Optical hub 502 includes a downstream transmitting portion 514 and an optional upstream receiving portion 516. In an exemplary embodiment, downstream transmitting portion 514 includes at least two of an analog downstream transmitter 518, a polarization multiplexed IM-DD downstream transmitter 520, and a coherent downstream transmitter 522. End users 506 are comparable to end users 308 (FIG. 3) and end users 408 (FIG. 4), and may, for example, include one or more downstream termination units. In the exemplary embodiment, end users 506 include at least two of an analog downstream receiver 524, a polarization multiplexed IM-DD downstream receiver 526, and a coherent downstream receiver 528. Where upstream communication is optionally desired (i.e., through upstream long fiber 510), upstream receiving portion 516 includes at least two of an analog upstream receiver 530, a polarization multiplexed IM-DD upstream receiver 532, and a coherent upstream receiver 534. In this exemplary embodiment, end users 506 include at least two of an analog upstream transmitter 536, a polarization multiplexed IM-DD upstream transmitter 538, and a coherent upstream transmitter 540. A polarization multiplexed IM-DD link is illustrated in the exemplary embodiment of FIG. 5. Nevertheless, the present systems and methods may be implemented utilizing a subset link that is not polarization multiplexed. The injection locking techniques described herein advantageously allow for the novel combination of polarization multiplexing with IM-DD.

In operation, optical hub 502 further includes an intelligent configuration unit 542, comparable to intelligent configuration units 318 (FIG. 3) and 442 (FIG. 4), and may be a standalone or integrated device having multiple functionalities, or a separate device in communication with other devices serving to multiplex, aggregate, and/or combine various signals. Intelligent configuration unit 542 works cooperatively with ODC 504 such that ODC 504 may demultiplex the heterogeneous signal types from one another to be separately transmitted over short fibers 512 to particular end users 506 capable of receiving that type of signal.

In an exemplary embodiment of fiber communication system 500, further includes a seed generator 544 and a wavelength filter 546. Wavelength filter 546 may include, for example, a WDM grating. In operation, wavelength filter 546 serves to support injection locking of laser diodes implemented within the various respective transmitters and receivers of the network. In an exemplary embodiment, the various optical sources represented by transmitters 518, 520, 522 include injection locked lasers that are modulated using different formats, and the master source (not shown) for injection locking is a multi-tone generator of high spectral purity (narrow linewidth), as described in co-pending U.S. patent application Ser. No. 15/283,632, discussed above. In an alternative embodiment, other or additional optical sources could be implemented, including, but not limited to, broadband wavelength sources. Implementation of the narrow linewidth source described herein advantageously allows for a significantly diversified set of modulation formats, including coherent optical modulation.

According to the embodiment illustrated in FIG. 5, wavelength filters may be advantageously implemented to separate multi-tone optical signals into individual wavelengths to injection lock the lasers. Additionally, the multi-tone sources may be placed in different locations. In an exemplary embodiment, in order to minimize complexity in the distribution portion of the network, a multi-tone source is disposed in within optical hub 502 near to where the downstream signals originate. In an exemplary embodiment, ODC 504 further includes a demultiplexing wavelength filter 548 and a multiplexing wavelength filter 550. Filter 548 may, for example, include a cyclic arrayed waveguide grating (AWG), and filter 550 may, for example, include a WDM grating or splitter.

Similar to the embodiment illustrated in FIG. 4, the access network fiber topology of fiber communication system 500 implements signals from sources including, without limitation: analog modulated optical carriers such as the subcarrier multiplexed channels used in cable; baseband digital modulated signals using IM-DD mechanisms such as NRZ, RZ, PAM4 and PAM8; differential detection signals such as DPSK and D-QPSK; coherent modulated optical signals such as BPSK, QPSK, and higher order QAM; and polarization multiplexing transmission techniques for coherent modulation and non-coherent modulation, as shown in the IM-DD configurations illustrated in FIG. 5.

In an alternative embodiment, fiber communication system 500 is further configured to implement coherent links by leveraging the high spectral purity of a common injection locking source (not shown) received by two different lasers, but where one of the round trip paths to a laser is shifted in phase by 90 degrees. This phase shifting generates the I and Q paths needed for a coherent QAM modulated signal using two directly modulated laser diodes. This technique can be expanded to two polarizations with 4 directly modulated laser diodes thereby achieving polarization multiplexing, as described in co-pending U.S. patent application Ser. No. 15/283,632, discussed above. In a further alternative embodiment, polarization multiplexing may be achieved through utilization of at least two direct detect links that share a common injection locking source. The resulting two injection locked transmitters can thus be polarization multiplexed once so synchronized through the common injection locked source. In this embodiment, the intensity modulation of light described here can be achieved through direct modulation of laser diode current. However, the present systems and methods may also utilize other intensity modulation techniques, such as electro-optical and electro-absorption intensity modulation techniques using external modulators.

Fiber communication system 500 differs from fiber communication system 400 system 500 is advantageously capable of avoiding use of temperature control or frequency control mechanisms, due to the fact that the novel filtering techniques of system 500, as well as the generation of equally spaced multi-tones, serves to restrict lasing to a fixed spacing between wavelengths. Systems and methods according to this embodiment further advantageously also results in the elimination of optical beat interference. System 500 further differs from system 400 in that, where system 400 utilizes two fibers for N subscribers that fully use the fiber spectrum, system 500 utilizes unmodulated optical carriers for injection locking which use half of a single fiber spectrum. Therefore, in this example, with two fibers available, one half of a one fiber spectrum is used for downstream data, one half of one fiber spectrum is used for upstream data, one half of one fiber spectrum is used for unmodulated optical carriers, and the remaining half of the fiber spectrum of the two fibers is not used. Accordingly, if three fibers are utilized, an entire spectrum of a first fiber may be used for downstream data transmission, an entire spectrum of a second fiber may be used for upstream data transmission, and an entire spectrum of the third fiber may be used for unmodulated optical carriers. Thus, to carry N optical carriers with the same bandwidth, system 400 would need two optical fibers, whereas system 500 would need three optical fibers. In this example, system 500 is less efficient than system 400; however, the laser diodes (not numbered) utilized by end users 506 are not required to be wavelength-specific, thereby resulting in significantly lower capital and operating expenditures throughout system 500.

In a further alternative embodiment, the present inventors contemplate hybrid approach to implement principles of systems 400 and 500 together, including, without limitation, a wavelength filtered architecture where some of the optical sources are wavelength-tuned or of a fixed wavelength to fit within a filtered channel. In such a hybrid system, the seed optical signal to injection lock the optical transmitter may be avoided for at least a portion of the optical links. In an exemplary embodiment of this alternative, some optical signals will be capable of wavelength tuning and others will have fixed wavelengths requiring operator knowledge of the wavelength and signal format to optimize performance, and/or wavelength filtering is implemented utilizing injection locking techniques.

FIGS. 6A-6D illustrate an exemplary process 600 for successive wavelength placement of heterogeneous optical signals in accordance with an exemplary embodiment of the present disclosure. Process 600 implements an intelligent wavelength mapping approach (e.g., by an intelligent configuration unit according to the above-described embodiments) of optical signals over the wavelength transmission window of a fiber. In an exemplary embodiment, process 600 includes one or more algorithms for optical signal wavelength allocation and configuration optimization, and includes methodology regarding how a fiber infrastructure is optimized to achieve capacity, robustness, and other performance targets based on one or more of optical link resources and component characteristics, optical channel conditions, and the transmission requirements.

Process 600 provides for one or both of wavelength mapping and wavelength allocation for the different optical links, having different modulation formats and detection schemes, to meet traffic service requirements of the fiber infrastructure. Process 600 advantageously allows an optical hub to significantly increase the volume of heterogeneous signals that can be transmitted over available fiber spectral resources. Process 600 is organized such that, when implemented by a processor (e.g., processor 324, FIG. 3), an intelligent configuration unit is able to gather information on components used, types of optical links, and types and characteristics of the architecture within the fiber communication system. For example, process 600 is configured to determine whether a particular signal is represented by a tunable wavelength, a fixed wavelength, or a filtered wavelength or a hybrid architecture.

In an exemplary embodiment, process 600 is further configured to leverage one or more of the following optical carrier parameters/characteristics: individual carrier power levels; aggregate carrier power; number of optical carriers; wavelength spacing among carriers; modulation format used; carrier configurability; and carrier tunability. Process 600 may be further configured to additionally take into consideration one or more of the following fiber environment characteristics: type of fiber; amplification and/or loss devices (e.g., an EDFA); wavelength filters or splitters; and fiber distribution network topology. Additionally, process 600 may still further consider the measurement and classification of fixed-wavelength and unknown-wavelength laser diodes in order to determine a correct wavelength bin. The size of a wavelength bin, for example, may be affected by an assessment of temperature, age, or power variability. In an exemplary embodiment, a wavelength is presumed to stay within a determined wavelength bin when the wavelength is deemed to be controllable.

In an optional embodiment of process 600, depending on the modulation format used, target optical signal to noise ratio (OSNR) requirements for different optical signals are calculated in advance and generated into a lookup table, which may then be utilized during implementation of process 600 to control and minimize the optical power of each optical carrier, and also to adjust optical power of a carrier when noise level increases due to non-linear effects/interactions among the several carriers. Such non-linear effects may include self-phase modulation (SPM), cross-phase modulation (CPM), and/or four-wave mixing (FWM). The effects of SPM and CPM are more pronounced on signals with higher modulation bandwidths. The effects of FWM and CPM are more pronounced with narrower/decreased channel spacing of wavelengths. The effects of FWM are also more pronounced with signals having lower chromatic dispersion. FWM is therefore of particular concern with spread signals.

Furthermore, noise assessment may depend not only on the type of source, but also on whether direct or external modulation is used, as well as any introduction of noise by devices such as amplifiers, such as noise from an EDFA, or amplified spontaneous emission (ASE)/superluminescence).

Figure 6A:
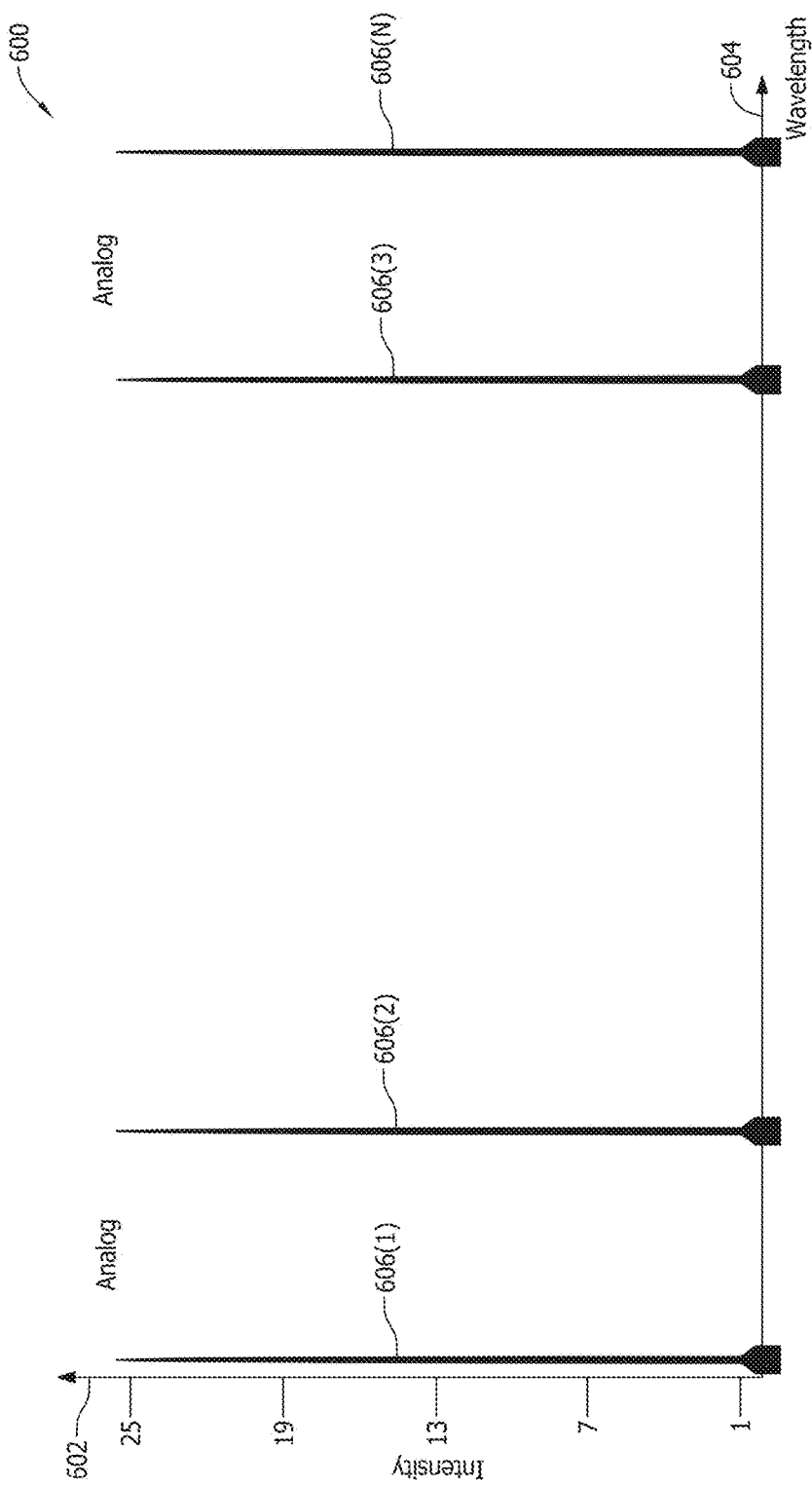
FIGS. 6A-6D illustrate an exemplary successive wavelength placement of heterogeneous optical signals in accordance with an exemplary embodiment of the present disclosure.

FIG. 6A illustrates a graphical representation of an initial wavelength placement according to process 600. According to an exemplary embodiment, this initial placement is represented by an optical signal intensity 602 (y-axis) over a wavelength spectrum 604 (x-axis) of the fiber for a plurality of analog carrier signals 606(1), . . . 606(N). Placement of analog carrier signals 606 (also referred to as carriers or carrier waves) may occur, for example, after an initial assessment of the optical link resources and characteristics of the network topology.

In the exemplary embodiment, analog carriers 606 are chosen for initial placement because they represent fixed wavelength optical carriers, and may include analog modulated links carrying their respective signals at high power levels due to high signal to noise ratio (SNR) requirements. Analog carrier signals are typically not tunable, but are often the largest contributors of noise over wavelength spectrum 604. Analog carrier signals include high linearity requirements, and are considered to be less flexible than other signals. Analog transmitters (e.g., transmitters 418 (FIG. 4), 518 (FIG. 5)), however, can be set at particular frequencies. Accordingly, transmission frequencies are chosen for analog carrier signals 606 such that carriers 606 are spread wide across wavelength spectrum 604 before consideration of other signals of different types.

Once process 600 verifies that the power level of analog signals 606 is optimized, their noise level deemed acceptable, and that the several optical carriers are properly spaced apart without interference from one another, process 600 places the next signal in the successive wavelength placement scheme. Optionally, before placing additional signals, process 600 may first calculate noise (not shown) across wavelength spectrum 604 based on the placement of the optical carriers of analog carrier signals 606, in order to more optimally place additional carriers in appropriate available wavelengths within wavelength spectrum 604.

Figure 6B:
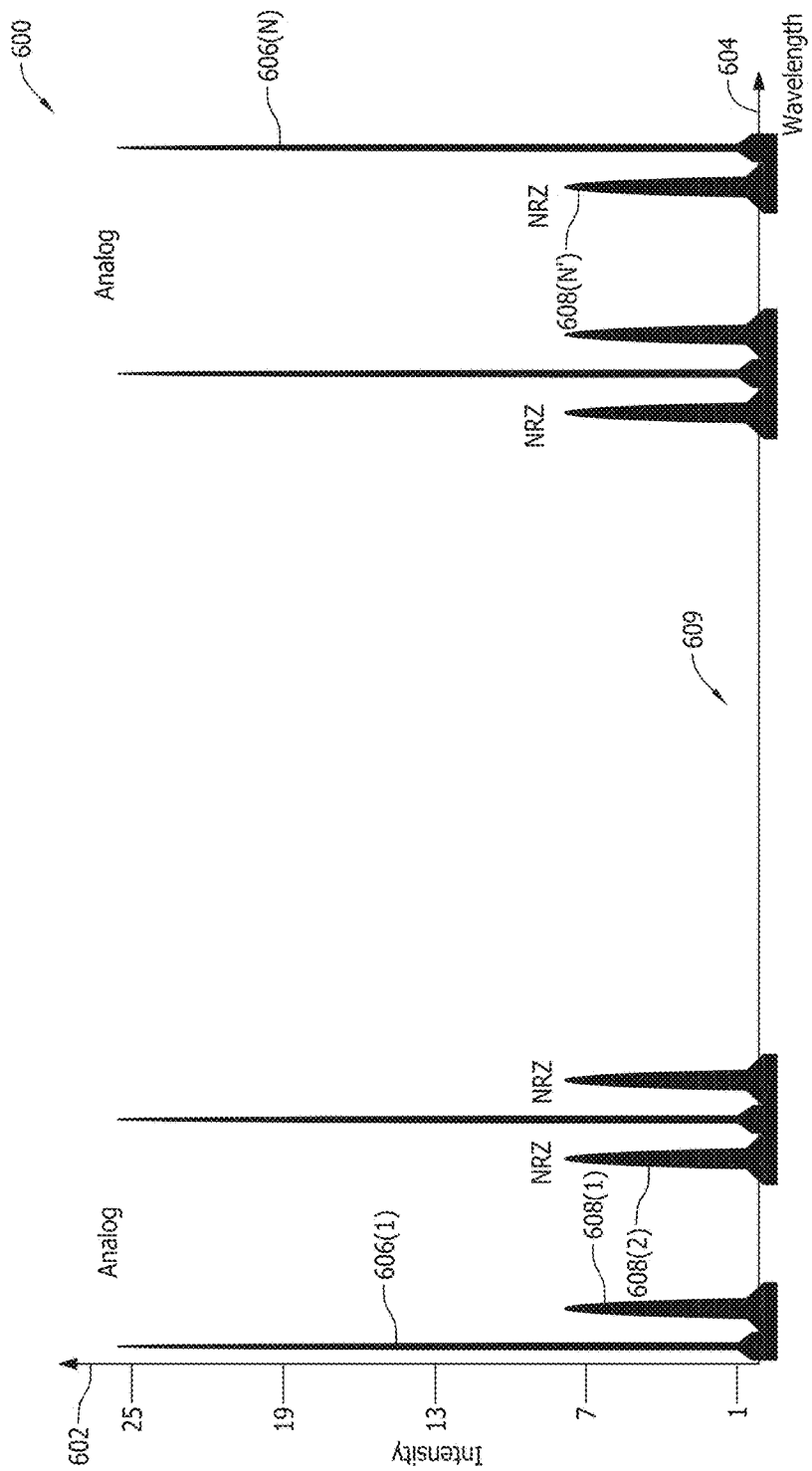

FIG. 6B illustrates a graphical representation of successive wavelength placement of heterogeneous optical signals according to process 600 following the initial wavelength placement illustrated in FIG. 6A.

In the exemplary embodiment, robust optical carriers are next chosen for placement within portions along wavelength spectrum 604 that experience the worst noise conditions, that is, relatively near to or adjacent the placement of analog carrier signals 606. In the example of FIG. 6B, first NRZ optical carriers 608(1), . . . 608(N') are chosen for this second level of placement because they represent direct modulated/direct detection optical link carriers which can be adjusted in power so that the NRZ transmissions operate at an optimum target performance within predetermined appropriate margins.

NRZ optical carriers 608 are suited to fill the spectrum adjacent analog carriers due to the "forgiving" nature of an NRZ signal. That is, first NRZ optical carriers 608 are considered to have among the lowest SNR and the highest noise tolerance of the heterogeneous signals, and are additionally quite tolerant of the non-linear components generated by adjacent signals (i.e., analog carriers 606) along wavelength spectrum 604. In an exemplary embodiment, first NRZ optical carriers 608 are placed to effectively border the portion of wavelength spectrum around each analog carrier signal 606. Alternatively, QPSK signals have comparable carrier characteristics, and may be placed adjacent analog carrier signals 606 in place of first NRZ optical carriers 608. A pocket 609 is thereby formed between adjacent first NRZ optical carriers 608, which represents an area of relatively low noise within wavelength spectrum 604.

After placement of robust first NRZ optical carriers 608, process 600 may optionally recalculate noise across wavelength spectrum 604 to both account for the addition of the new optical carriers (i.e., first NRZ optical carriers 608), and to more optimally identify pocket 609 for placement of signals within wavelength spectrum 604 that have higher SNR requirements.

Figure 6C:
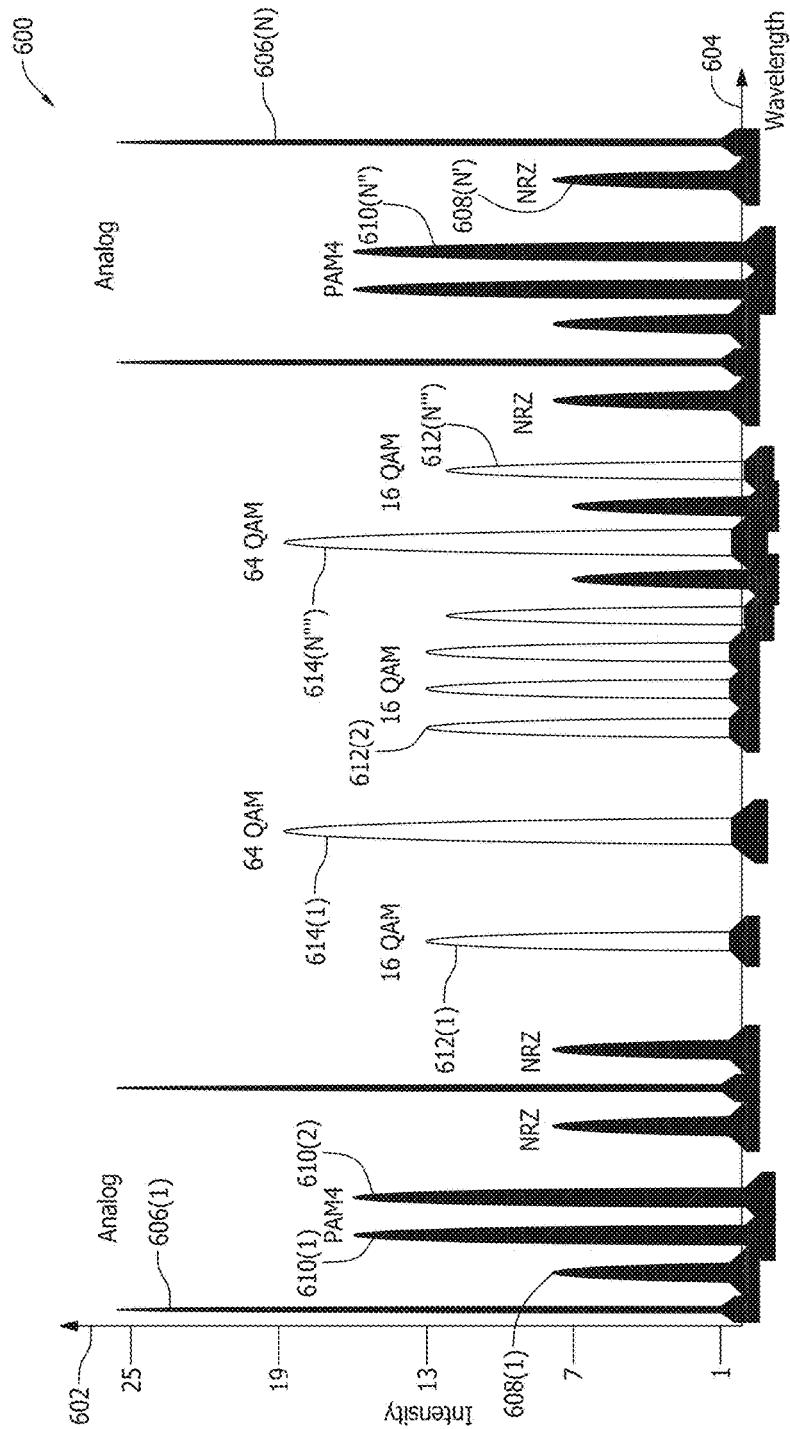

FIG. 6C illustrates a graphical representation of further successive wavelength placement of heterogeneous optical signals according to process 600, following the wavelength placement illustrated in FIG. 6B. In the exemplary embodiment, optical signals having higher OSNR requirements are next chosen for placement within pocket 609 (and similar regions of relatively low noise), and spaced from the placement of analog carrier signals 606. In the example of FIG. 6C, PAM4 optical carriers 610(1), . . . 610(N"), 16QAM optical carriers 612(1), . . . 612(N'"), and 64QAM optical carriers 614(1), . . . 614(N"") are chosen for this third level of placement because they represent relatively high SNR optical link carriers which generally are tunable, but require premium areas of low noise within wavelength spectrum 604. In the exemplary embodiment illustrated, 16QAM optical carriers 612 may require a lower SNR than 64QAM optical carriers 614, for example, but will still require a significantly higher SNR than first NRZ optical carriers 608. According to the exemplary embodiment, 16QAM optical carriers 612 and 64QAM optical carriers 614 may represent either coherent or digital carriers.

After placement of the higher SNR optical carriers 610, 612, and 614, process 600 may again optionally recalculate noise across wavelength spectrum 604, as well as the non-linear effects across the different carriers, to account for the addition of the newly placed optical carriers. According to this optional embodiment, the power level on some of the optical carriers may be further adjusted in the event that the particular SNR requirements for the intended modulation format of a specific carrier is not satisfied. After such power adjustment, non-linear distortion and noise impact may then be recalculated.

Figure 6D:
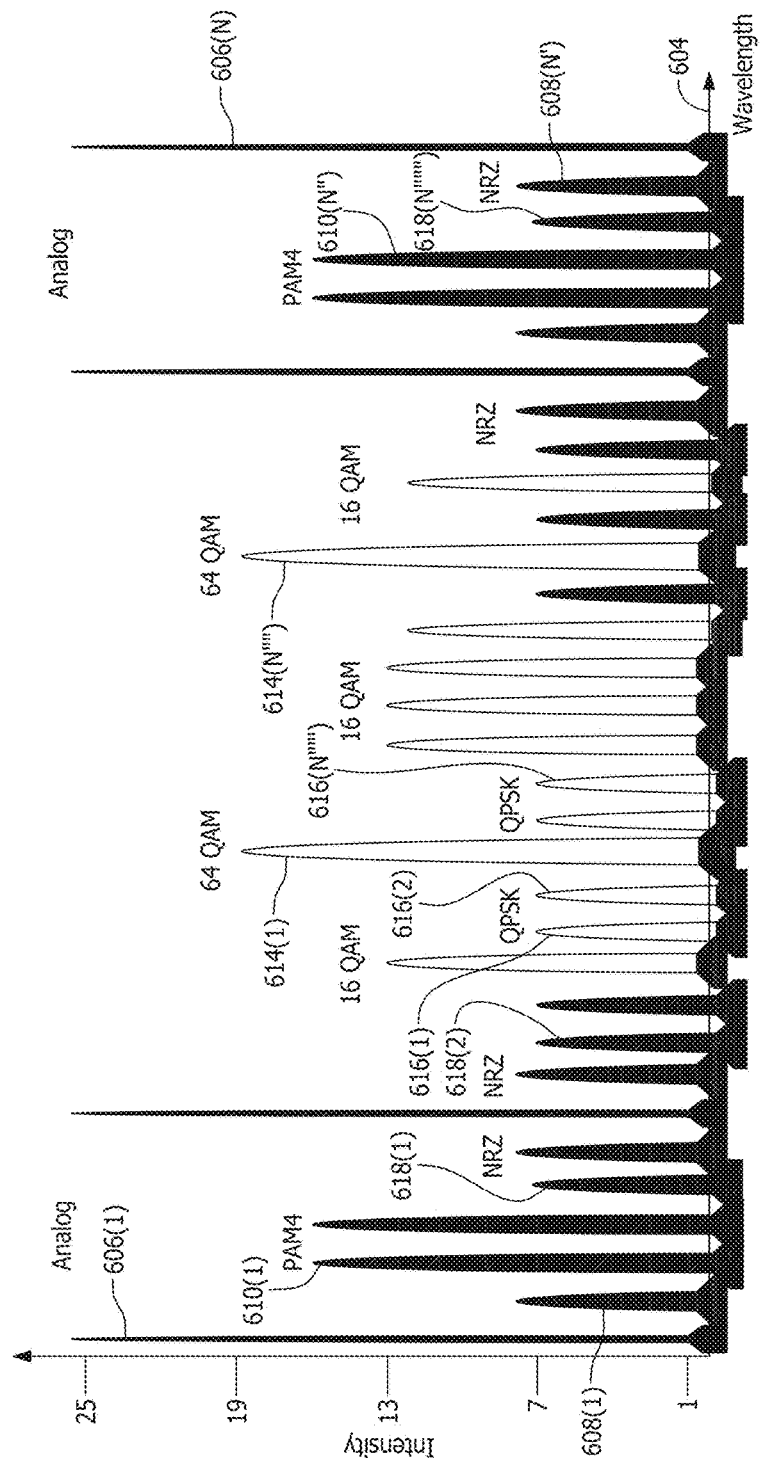

FIG. 6D illustrates a graphical representation of a final successive wavelength placement of heterogeneous optical signals according to process 600, following the wavelength placement illustrated in FIG. 6C. In the exemplary embodiment, the remaining more robust, but generally lower power level, carriers are inserted into the remaining available portions of wavelength spectrum 604. In the example of FIG. 6D, QPSK optical carriers 616(1), . . . 616(N''''') and second NRZ optical carriers 618(1), . . . 618(N''''') are chosen for this fourth level of placement because they represent generally tunable and tolerant carriers having lower SNR requirements then the less tolerant carrier signals added as illustrated in FIG. 6C.

As described above, NRZ and QPSK carrier signals have some comparable characteristics with respect to robustness and SNR requirements, and may be substituted for each other (or mixed) in the second and fourth placement levels described herein, depending on particular signal characteristics such as symbol rate, baud rate, etc. Process 600 with us is configured to optimally choose the robust optical signals to add into wavelength regions having suboptimal noise levels, and according to measured and/or monitored signal and fiber characteristics. Once all of the optical carrier signals are so placed, non-linear effects and noise impact may be optionally recalculated.

Figure 7:
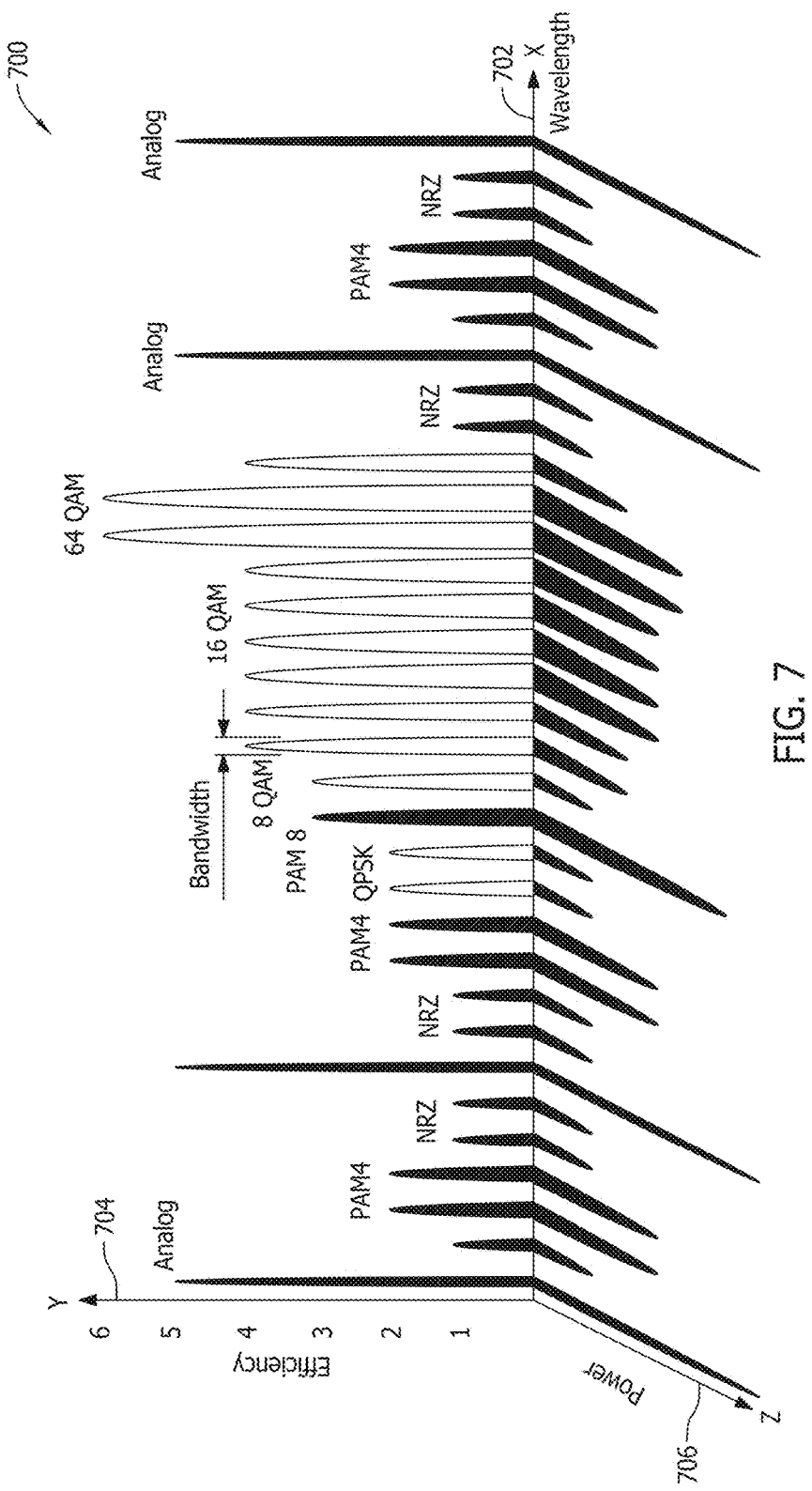
FIG. 7 illustrates an alternative three dimensional wavelength placement of the embodiment depicted in FIG. 6D.

FIG. 7 illustrates an alternative graphical representation of a three dimensional wavelength placement 700, as compared with the final carrier placement of process 600, depicted in FIG. 6D. In this exemplary embodiment, wavelength placement 700 is represented by wavelength spectrum 702 (x-axis), efficiency 704 (y-axis), and power 706 (z-axis), illustrating wavelength allocation with a fiber strand (not shown) following placement according to a performance optimization process or algorithm, for example, process 600 (FIG. 6).

As described above, when a single carrier is the only signal occupying a fiber strand, interactions with other carriers are not a concern. Such single carrier fiber strands are limited chiefly by the amount of power that particular fiber can handle without exerting distortion onto itself. A signal with lower SNR requirement will generally be more robust than one with a higher SNR requirement, and when two or more such signals are present within the same fiber, interaction and interference between the signals must be addressed.

In the exemplary embodiment, wavelength placement 700 is illustrated as a three dimensional consideration of various requirements regarding power, SNR, efficiency, adjacent noise characteristics, and bandwidth occupancy. In an alternative embodiment, different signal and/or fiber characteristics, including, without limitation: modulation format; polarization multiplexing; channel coding/decoding, including forward error correction; fiber length; aggregate carrier power; number of optical carriers; wavelength spacing among carriers; carrier configurability; carrier tenability; fiber type; amplification and/or loss devices; wavelength filters or splitters; and fiber distribution network topology. In an alternative embodiment, placement 700 may be optimized in consideration of a number of these additional considerations, thereby rendering placement 700 as a five or six dimensional allocation placement, or greater.

Figure 8:
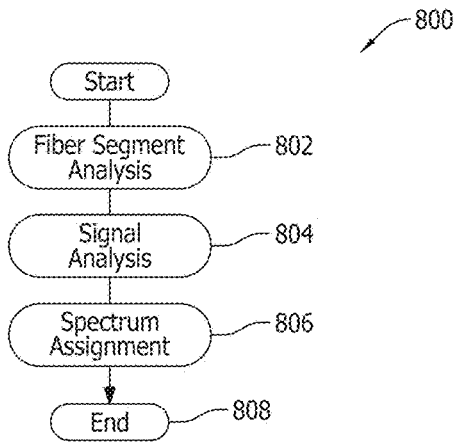
FIG. 8 is a flow chart diagram of an exemplary optical signal wavelength allocation process.

FIG. 8 is a flow chart diagram of an exemplary optical signal wavelength allocation process 800 that can be implemented with fiber communication systems 300, 400, 500, and complimentary to process 600, depicted in FIGS. 3-6, respectively, and described above. Process 800 represents one or more subroutines and/or algorithms for optical signal wavelength allocation and configuration optimization. In an exemplary embodiment, process 800 begins at step 802. In step 802 process 800 performs a fiber segment analysis subprocess, explained further below with respect to FIG. 9. After completing the fiber segment analysis, process 800 proceeds to step 804. In step 804, process 800 performs a signal analysis subprocess, explained further below with respect to FIGS. 10A-C. After completing the signal analysis, process 800 proceeds to step 806. In step 806, process 800 performs a spectrum assignment subprocess, explained further below with respect to FIG. 11. In an exemplary embodiment, the subprocess of step 806 may include, or be complementary with, process 600, depicted in FIGS. 6A-6D. Upon completion of spectrum assignment of optical carriers, process 800 proceeds to step 808. In an exemplary embodiment, step 808 ends process 800. In an alternative embodiment, step 808 represents a return to step 802, in order to repeat process 800 one or more times as desired.

Figure 9:
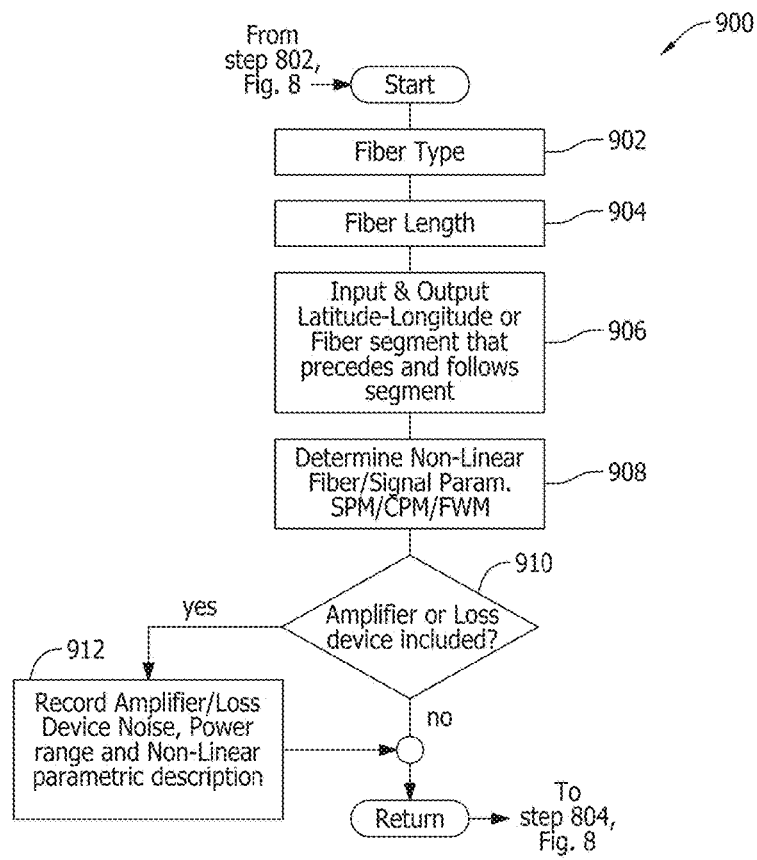
FIG. 9 is a flow chart diagram of an exemplary fiber segment analysis process that can be implemented with the allocation process depicted in FIG. 8.

FIG. 9 is a flow chart diagram of an exemplary fiber segment analysis subprocess 900 that can be implemented with allocation process 800 depicted in FIG. 8. In an exemplary embodiment, subprocess 900 embodies step 802, FIG. 8, or may begin from a prompt or call from step 802. Subprocess 900 proceeds from start to step 902. In step 902, subprocess 900 determines the type of fiber (e.g., long fiber 310, FIG. 3) utilized to broadcast the heterogeneous signals. In an exemplary embodiment, the fiber type is SM-SMF28. Subprocess 900 then proceeds to step 904, where the length of the fiber is determined. In an exemplary embodiment, the length is determined in kilometers. Subprocess 900 then proceeds to step 906, where latitude and longitude information regarding the fiber are determined. In an exemplary embodiment, such information considers both input and output from the fiber segment, as well as information that precedes and follows the fiber segment.

In addition to the general fiber information, subprocess 900 analyzes fiber parameters in consideration of the spectral placement of heterogeneous signals. For example, at step 908, subprocess 900 determines the presence of at least one of dispersion, loss, and non-linear model parameters for SPM, CPM, and FWM. In an exemplary embodiment, other parameters may be considered, as discussed above with respect to FIGS. 6-7. Subprocess 900 then determines whether the fiber includes an amplifier or lost device at step 910. In an exemplary embodiment, step 910 is a decision step. If an amplifier or lost device (e.g., EDFA/AMP) is included, step 910 proceeds to step 912, where the noise is recorded from the amplifier/loss device. In an exemplary embodiment, step 912 further records power range and/or a non-linear parametric description of the amplifier/loss device. Once recorded, subprocess 900 proceeds from step 912 and returns to process 800 (FIG. 8), and to step 804 specifically. If no amplifier/loss devices included at step 910, subprocess 900 proceeds directly from step 910 to step 804.

Figure 10A:
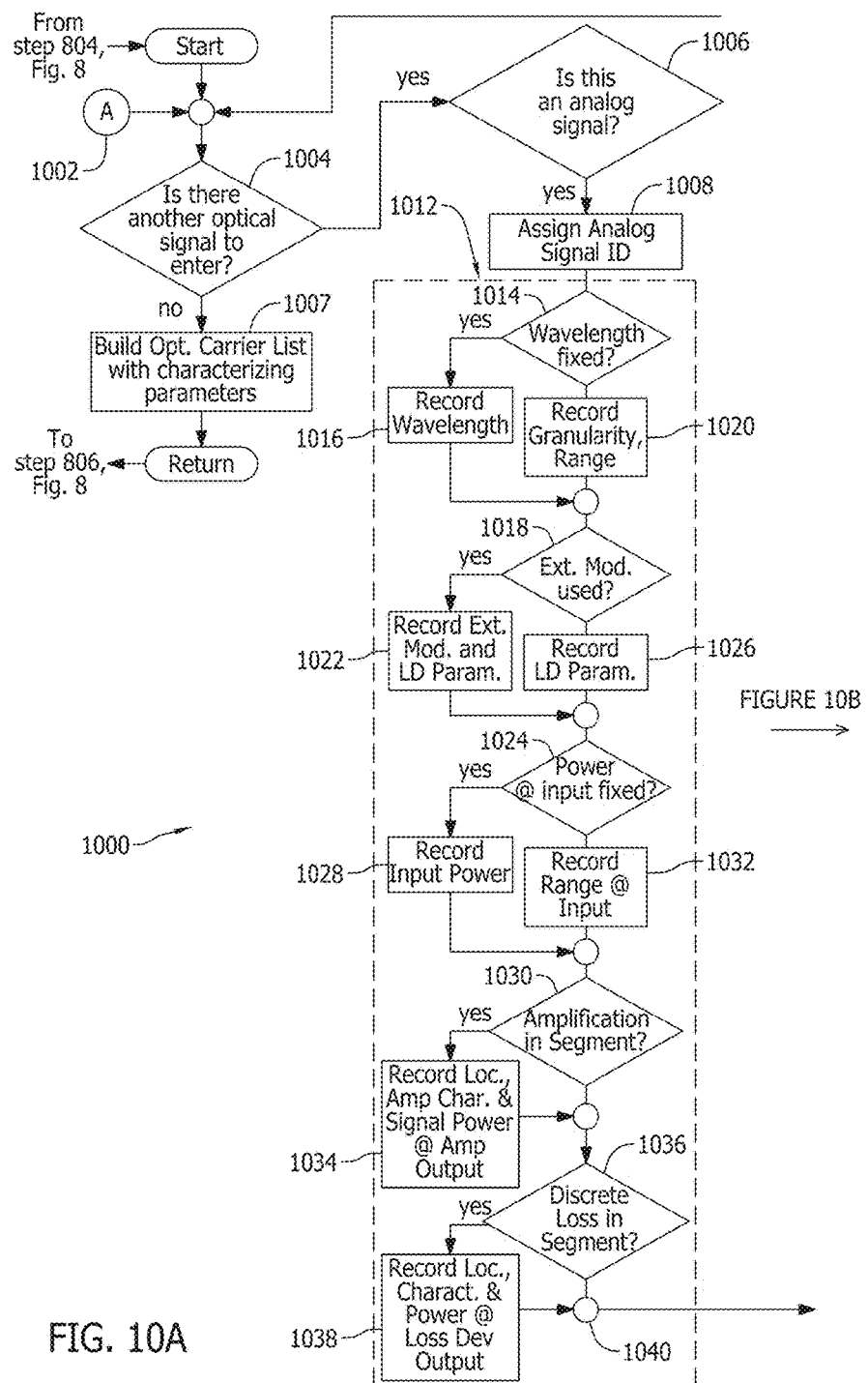
Figure 10C:
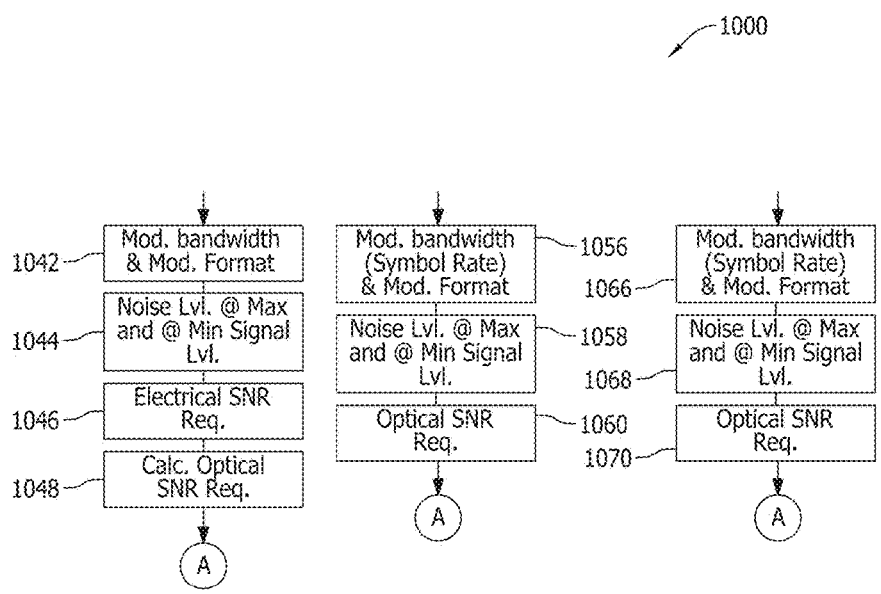

FIGS. 10A-C illustrate a flow chart diagram of an exemplary signal analysis subprocess 1000 that can be implemented with allocation process 800 depicted in FIG. 8. In an exemplary embodiment, subprocess 1000 embodies step 804, FIG. 8, or may begin from a prompt or call from step 804. In an alternative embodiment, subprocess 1000 may proceed directly after steps 910/912, FIG. 9, or simultaneously with subprocess 900.

Subprocess 1000 proceeds from start to step 1002. Step 1002 is a return point from the several subroutines included within subprocess 1000, described further below. Step 1002 returns subprocess 1000 to step 1004. Step 1004 is a decision step. In step 1004, subprocess 1000 analyzes the heterogeneous signals to determine whether there are any unassigned optical signals within the heterogeneous signal group. If step 1004 determines that there is at least one unassigned optical signal, subprocess 1000 proceeds to step 1006. If step 1000 for determining that there are no further optical signals to assign along the spectrum, subprocess 1000 instead proceeds to step 1007 which builds the optical carrier list along with the characterizing parameters, and thus a return to subprocess 800 (FIG. 8), and specifically to step 806.

Step 1006 is also a decision step. In step 1006, subprocess 1000 determines whether the optical signal at issue is an analog signal. If step 1006 determines that the optical signal is an analog signal, subprocess 1000 proceeds to step 1008, where the optical signal is assigned an analog signal ID. If, however, the optical signal is not determined to be an analog signal, subprocess 1000 proceeds to step 1010. After an analog signal ID is assigned in step 1008, subprocess 1000 proceeds to an analysis subroutine 1012. Analysis subroutine 1012 begins at step 1014. Step 1014 is a decision step. In step 1014, analysis subroutine 1012 determines whether the wavelength of the assigned optical signal is fixed. If the wavelength is determined to be fixed, analysis subroutine 1012 records the fixed wavelength at step 1016 and proceeds to step 1018. If though, step 1014 determines that the wavelength is not fixed, subroutine 1012 records the granularity and the range of the signal in step 1020, and proceeds to step 1018.

Step 1018 is a decision step. In step 1018, analysis subroutine 1012 determines whether external modulation is being utilized. If such modulation is determined to be utilized, analysis subroutine 1012 records the external modulation, as well as laser diode parameters, if any, at step 1022 and proceeds to step 1024. If though, step 1018 determines that external modulation is not being utilized, subroutine 1012 records the laser diode parameters in step 1026, and proceeds to step 1024. Step 1024 is a decision step. In step 1024, analysis subroutine 1012 determines whether power at an input is fixed. If the power is determined to be fixed, analysis subroutine 1012 records the input power at step 1028, and proceeds to step 1030. If though, step 1024 determines that the input power is not fixed, the power range at the input is recorded at step 1032, and analysis subroutine 1012 then proceeds to step 1030.

Step 1030 is a decision step. In step 1030, analysis subroutine 1012 determines whether there is amplification being implemented in the fiber segment. If such amplification is determined to be implemented, analysis subroutine 1012 records the location, amplifier characteristics, and output signal power at step 1034 and proceeds to step 1036. If though, step 1030 determines that there is no amplification implemented in the fiber segment, subroutine 1012 proceeds directly to step 1036. Step 1036 is a decision step. In step 1036, analysis subroutine 1012 determines whether there is a discrete loss in the fiber segment. If a discrete loss is detected, analysis subroutine 1012 records the location, characteristics, and output power loss at step 1038, and proceeds to step 1040. If though, step 1036 detects no discrete loss in the fiber segment, analysis subroutine 1012 then proceeds directly to step 1040.

Step 1040 exits analysis subroutine 1012. Once analysis subroutine 1012 is completed, the modulation bandwidth and modulation format of the assigned analog signal are determined at step 1042. At step 1044, the noise level is determined, as well as the maximum and minimum signal levels. At step 1046, subprocess 1000 determines the electrical SNR requirements for the assigned analog signal. At step 1048, subprocess 1000 calculates the optical SNR requirements for the assigned analog signal, and then proceeds back to step 1002.

Referring back to step 1010, if subprocess 1000 does not detect an analog signal in step 1006, subprocess 1000 then determines whether the optical signal at issue is one of a digital direct detection optical signal and a differential detection optical signal. That is, step 1010 is a decision step. If step 1010 determines that the optical signal is a direct or differential signal, subprocess 1000 proceeds to step 1050, where the optical signal is assigned a direct detection signal ID. If, however, the optical signal is not determined to be a direct/differential signal, subprocess 1000 proceeds to step 1052. After a direct detection signal ID is assigned in step 1050, subprocess 1000 proceeds to an analysis subroutine 1054. Analysis subroutine 1054 is substantially identical to analysis subroutine 1012, except the same steps are performed for the direct/differential signal, as opposed to an analog signal.

Once analysis subroutine 1054 is completed, the modulation bandwidth and modulation format, as well as the symbol rate, of the assigned direct/differential signal are determined at step 1056. In step 1058, the noise level is determined, as well as the maximum and minimum signal levels. At step 1060, subprocess 1000 calculates the optical SNR requirements for the assigned direct/differential signal, and then proceeds back to step 1002.

Referring back to step 1052, if subprocess 1000 does not detect a direct/differential signal in step 1010, subprocess 1000 then determines whether the optical signal at issue is a digital coherent optical signal. That is, step 1052 is a decision step. If step 1052 determines that the optical signal is a coherent signal, subprocess 1000 proceeds to step 1062, where the optical signal is assigned a coherent signal ID. If, however, the optical signal is not determined to be a coherent signal, subprocess 1000 returns to step 1002. After a coherent signal ID is assigned in step 1062, subprocess 1000 proceeds to an analysis subroutine 1064. Analysis subroutine 1064 is substantially identical to analysis subroutines 1012 and 1054, except the same steps are performed for the coherent signal, as opposed to an analog or direct/differential signal.

Once analysis subroutine 1064 is completed, the modulation bandwidth and modulation format, as well as the symbol rate, of the assigned direct/differential signal are determined at step 1066. In step 1068, the noise level is determined, as well as the maximum and minimum signal levels. At step 1070, subprocess 1000 calculates the optical SNR requirements for the assigned coherent signal, and then proceeds back to step 1002. The steps outlined above, particular steps need not be performed in the exact order they are presented, unless the description thereof specifically require such order.

Figure 11:
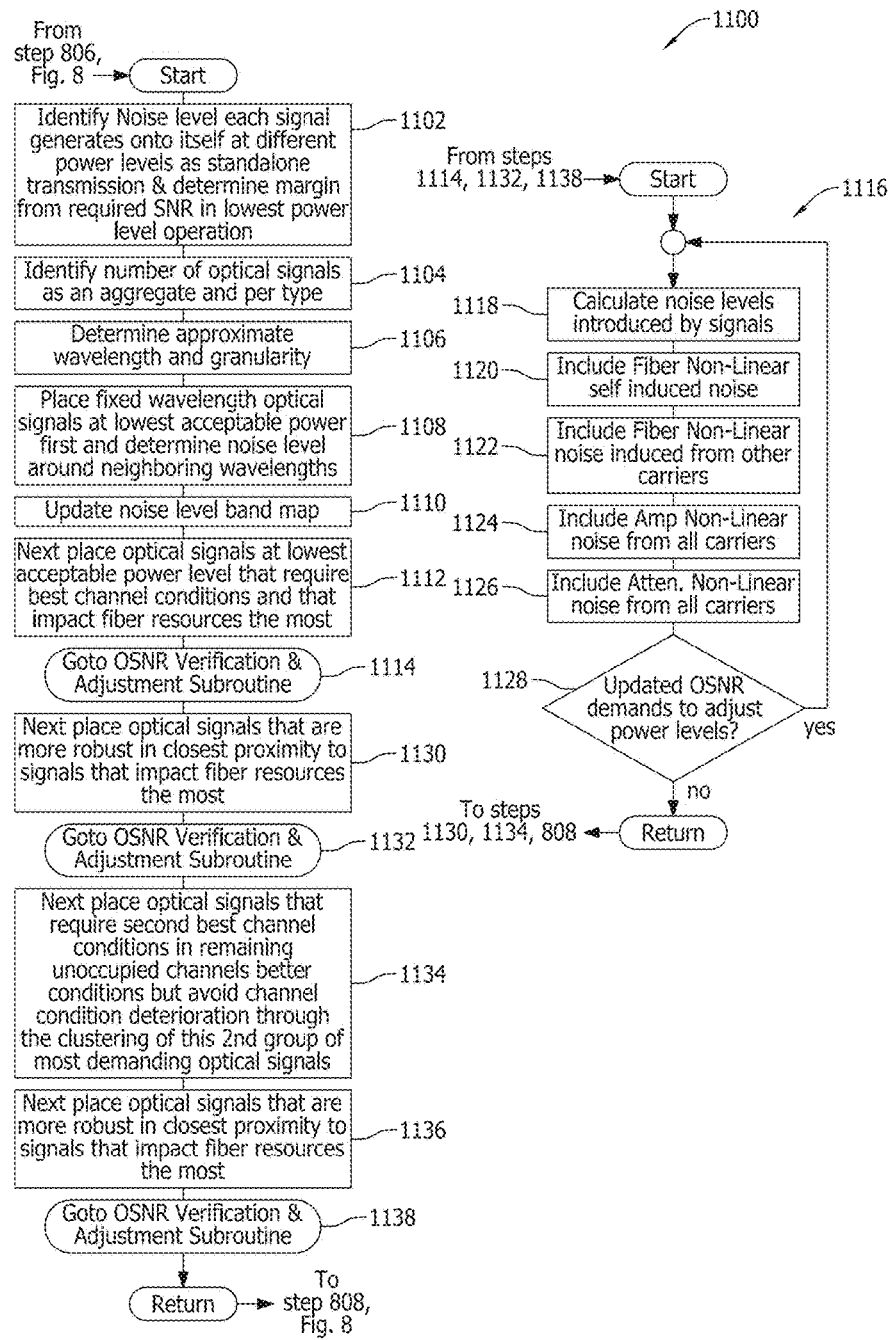
FIG. 11 is a flow chart diagram of an exemplary spectrum assignment process that can be implemented with the allocation process depicted in FIG. 8.

FIG. 11 is a flow chart diagram of an exemplary spectrum assignment subprocess 1100 that can be implemented with allocation process 800 depicted in FIG. 8. In an exemplary embodiment, subprocess 1100 embodies step 6, FIG. 8, or may begin from a prompt or call from step 806. In an alternative embodiment, subprocess 1000 may proceed directly after step 1007, FIG. 10A, or simultaneously with subprocesses 900 and 1000.

Subprocess 1100 proceeds from start to step 1102. Step 1102 analyzes the heterogeneous signal to identify the noise level each individual signal generates onto itself different power levels as a standalone transmission. In step 1102, subprocess 1100 further determines the margin from SNR requirements for the lowest power level of operation. In step 1104, subprocess 1100 identifies the number of optical signals as an aggregate, and by type of optical signal. In step 1106, subprocess 1100 determines the approximate wavelength and granularity for each assigned signal. In step 1108, subprocess 1100 places the fixed wavelength optical signals at lowest acceptable power levels in a primary position (e.g., FIG. 6A), and then determines the noise level surrounding neighboring wavelengths. Once the fixed wavelength optical signals are placed, subprocess 1100 optionally updates the noise level band map at step 1110.

Once the fixed wavelength optical signals are assigned, subprocess 1100 then proceeds to step 1112, where optical signals are placed at relatively lower acceptable power levels, but which require relatively better channel conditions, and which also will realize the greatest impact on fiber resources (e.g., FIG. 6B), that is, apart from the fixed wavelength optical signals. In an exemplary embodiment, after the first two optical signal placements are made, subprocess 1100 proceeds to step 1114, where a subroutine 1116 is called to verify and/or adjust the OSNR.

Subroutine 1116 begins at step 1118. In step 1118, subroutine 1116 calculates the noise levels introduced by the one or more optical signals at issue. In step 1120, subroutine 1116 determines non-linear, self-induced noise. In step 1122, subroutine 1116 determines non-linear noise which may have been induced from other carriers. In step 1124, subroutine 1116 determines amplifier non-linear noise from all carriers. In step 1126, subroutine 1116 determines attenuator non-linear noise from all carriers. The preceding steps of subroutine 1116 may be performed in the order listed, in a different order, or simultaneously. Once the noise in non-linear components are determined, subroutine 1116 proceeds to step 1128. Step 1128 is a decision step. In step 1128, subroutine 1116 determines whether the verified OSNR levels should warrant an adjustment in power levels. If the power level adjustment is warranted, subroutine 1116 returns to step 1118 and recalculates the noise levels and determines nonlinear components as described above. If no power level adjustment is warranted, on the other hand, subroutine 1116 completes, and returns to the step following the call to subroutine 1116 (in this case, step 1130). In an alternative embodiment, subroutine 1116 may be called at any point after placement of a particular optical signal.

In step 1130, a third placement of optical signals is performed (e.g., FIG. 6C) to assign the spectrum for those signals that are considered generally robust, and thus assign such signals in relatively close proximity to those signals that impact fiber resources most significantly. Once so assigned, subprocess 1100 proceeds to step 1132, which calls subroutine 1116. Once subroutine 1116 is completed, subprocess 1100 proceeds from step 1132 to step 1134. In step 1134, a fourth placement of optical signals is performed (e.g., FIG. 6D) to assign the spectrum for those signals that require the next best channel conditions, relative to the previously assigned signals, in the remaining unoccupied channels that provide such optimum conditions. In an exemplary embodiment of step 1134, placement of optical signals is performed to avoid channel condition deterioration through clustering of this particular group of optical signals. Optionally, after step 1134, subprocess 1100 may perform an additional step 1136, in order to place optical signals that are considered a generally more robust relatively close proximity to those signals that impact fiber resources most significantly. Once these optical signals are so placed, subprocess 1100 proceeds to step 1138, where subroutine 1116 is again called, and after which, subprocess 1100 returns to process 800 (FIG. 8), specifically step 808.

Figure 12:
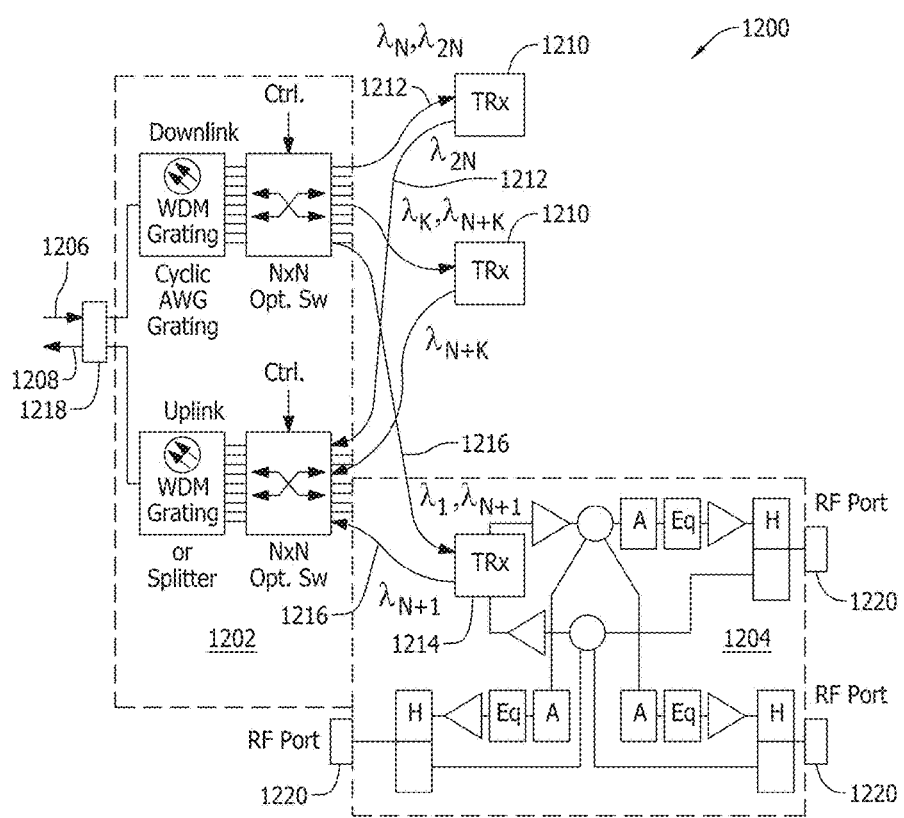
FIG. 12 illustrates an alternative hybrid optical distribution center that can be implemented with the fiber communication systems depicted in FIGS. 3-5.

FIG. 12 illustrates an alternative hybrid ODC 1200 that can be implemented with fiber communication systems 300, 400, and 500, depicted in FIGS. 3, 4, and 5, respectively. In an exemplary embodiment, hybrid ODC 1200 includes an optical portion 1202 and an HFC portion 1204. Optical portion 1202 includes an architecture similar to ODC 404 (FIG. 4) and ODC 504 (FIG. 5), as described above. HFC portion 1204 includes an architecture similar to deep nodes 306 (FIG. 3), also described above. As illustrated, hybrid ODC 1200 includes at least one HFC portion 1204 within its integrated structure, but may include a plurality of HFC portions 1204 within the device structure, that is, portions 1202 and 1204 are not separated by a material distance.

In the exemplary embodiment, hybrid ODC 1200 connects to an optical hub (e.g., optical hub 302, 402, or 502) by downstream long fiber 1206 and optional upstream long fiber 1208. Hybrid ODC 1200 communicates with optical transceivers 1210 of respective end users (e.g., end users 308, 406, 506) through short fibers 1212. Similarly, hybrid ODC 1200 communicates with an optical transceiver 1214 of HFC portion 1204 through dedicated fibers 1216. Whereas short fibers 1212 may span distances of up to several thousand feet, dedicated fibers 1216 may span a distance of less than a few feet to connect optical portion 1202 to HFC portion 1204 within an integrated device architecture. According to this alternative structure, hybrid ODC 1200 includes at least one input optical interface 1218 for communication with the optical hub (not shown in FIG. 12), and one or more output electrical interfaces 1220 for communication with respective end users (not shown in FIG. 12) that are not configured to directly receive and transmit optical signals. For simplicity of illustration, output optical interfaces to transceivers 1210 are not shown. In some embodiments, transceivers 1210, 1214 may include separate transmitters and receivers.

As illustrated in the exemplary embodiments depicted herein, a plurality of differing optical signals (i.e., analog, direct, differential, coherent, etc.) may be intelligently monitored and assigned to be simultaneously over the same fiber segment, and without requiring any retrenching of new fiber to transmit the differing, heterogeneous carriers. For network environments having limited fiber resources, implementation of the present systems and methods significantly increases the ability (e.g., of an optical hub) to multiplex optical signals efficiently. Such fiber-optic distribution networks advantageously realize the ability to utilize different coexisting optical transport systems within the same network. Such different optical transport systems, even though coexisting based on a set of configuration parameters, may nevertheless be selected through one or more of the several processes, subprocesses, and algorithms described herein that optimize signal placement based on the different performance metrics.

Intelligent Edge to Edge Optical System and Wavelength Services Provisioning

Further to the embodiments described above, it is desirable to provide systems and methods that are particularly capable of provisioning edge-to-edge wavelength connectivity services based on the performance criteria described herein. It is further desirable to be able to operate the network and its components such that the technological performance can be optimized, both in general and in real-time, to factor in cost criteria in an efficient manner. The present embodiments provide such a provisioning system for optical coherent transmissions, which has the advantage of being capable of deployment with respect to non-coherent transmission services, and particularly regarding transmissions that traverse, and require management of resources, traversing and managing resources in the access-, regional-, and/or metro-/backbone-portions of an optical edge-to-edge network.

As described above, the demand for transmission capacity for business services has been increasing exponentially. At the same time, broadband access providers have been deploying fiber infrastructure deeper and deeper, to the point of being in reasonably near proximity to virtually all customers. Within the sphere of cable operators, sizable portions of operator networks are migrating to N+0 architectures. In such migrated systems, the physical distance to two a given consumer location is expected to be approximately 1000 feet or less. Thus, is becoming cost advantageous to provide wavelength services through direct fiber connectivity to customers.

However, despite this increasing extensive fiber coverage, the number of available or unused fibers is still very limited. WDM techniques have been conventionally utilized to address this fiber scarcity problem. These conventional techniques provide some ability to manage the wavelength spectrum to assess optical resources, the optical signal power, and the crosstalk noise optical carriers generate across the wavelength spectrum within a fiber.

Additionally, in the access network, optical links are known to utilize analog optics. An analog optic link implements intensity modulation of the optical carrier by the cable in the downstream direction, and RF spectrum in the upstream direction. Analog optic links are also referred to as subcarrier multiplexed optical links, because the different RF video and data channels are frequency-multiplexed to form the cable RF spectrum. Seen from an optical carrier perspective, the RF channels of this spectrum are considered to be subcarriers. In aggregate, these subcarriers form the RF signal that modulates the optical carrier.

DOCSIS transmissions, for example, require a high RF signal quality, that is, a high SNR. To achieve such high RF signal quality needs (also required with other types of signals), the level of optical power used will also be very high, approaching the level where the operating condition of the fiber becomes non-linear. In such instances, there is a limit in the aggregate optical power that a single fiber can handle. Accordingly, the maximum number of optical carriers for a fiber is determined such that the aggregate optical power of the fiber can be maintained within a tolerable threshold. Analog optical links, for example, are deemed to operate at "high" optical power (e.g., as much as 10 dBm or higher), non-coherent optical links such as intensity modulated direct detect links (IM-DD), are deemed to operate at "medium" optical power, and coherent optical links are deemed to operate at "low" optical power (i.e., the lowest power level compared to the other technologies) due to the high sensitivity levels at which the coherent optical links operate.

The embodiments described above present particular solutions that allow suitable coexistence among all the different carrier types (i.e., in addition to coexistence of different carrier signals of the same type) that share the same fiber. According to these embodiments, multiple carrier types (e.g., analog, NRZ, PAM, QAM, QPSK, etc.) may be efficiently transmitted along a single fiber, whereas conventional systems transmit only multiple signals of the same carrier type. The present systems and methods are configured to manage the optical energy emission from other optical channels and types. These advantageous techniques improve over conventional attempts to address fiber scarcity in edge-to-edge optical networks, which string more fiber between the edge-to-edge end points, which is very expensive.

The systems and methods described further herein thus provide an additional wavelength-based solution that utilizes wavelength resources within the O-, S-, C-, and L-Bands.

Figure 13B:
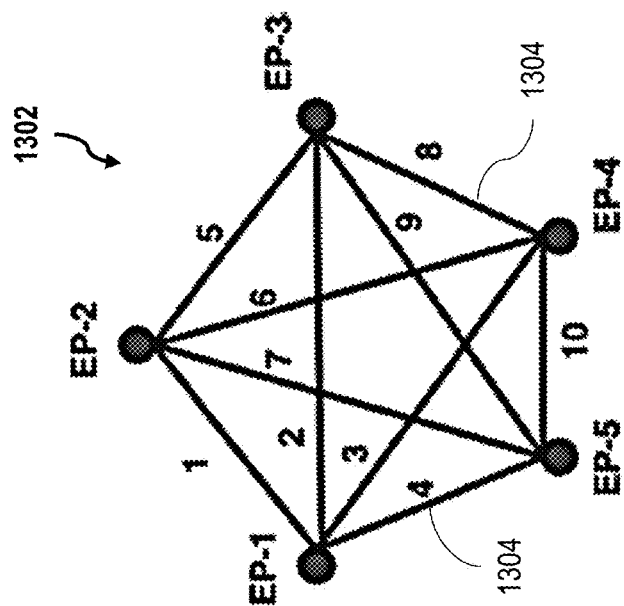
FIGS. 13A-B illustrate point-to-point optical connections between two end points and five end points, respectively, in accordance with an embodiment.
Figure 13A:
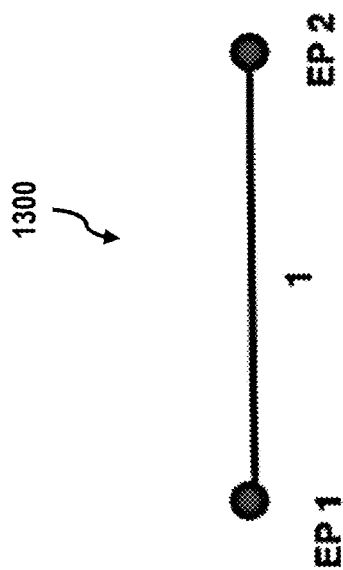

FIGS. 13A-B illustrate a point-to-point optical connection 1300 between two end points, EP 1 and EP 2, and a multi-end point network 1302 of five end points, EP-1 through EP-5. In an exemplary embodiment, wavelength services may be provided, for example, in the form of point-to-point connectivity, such as optical connection 1300, or a fully-meshed connected set of end points, as illustrated with respect to multi-end point network 1302. For simplicity of explanation, multi-end point network 1302 is illustrated to include five end points; in practice, a fully-meshed network may contain significantly more end points. The point-to-point solution of optical connection 1300 thus the forms the basic building block for multi-end point network 1302, which includes multiple point-to-point links 1304.

In an embodiment, each point-to-point link 1304 of multi-end point network 1302 may be indexed according to the suffixes (j, k) of the respective end points of the respective link 1304. Table 1, below, illustrates an association of end point indexes (n(j), n(k)), for pairs of opposing end points, to a respective optical connection index m(i), for multi-end point network 1302.

TABLE 1

| n(j) | n(k) | m(i) |
|---|---|---|
| 1 | 2 | 1 |
| 1 | 3 | 2 |
| 1 | 4 | 3 |
| 1 | 5 | 4 |
| 2 | 3 | 5 |
| 2 | 4 | 6 |
| 2 | 5 | 7 |
| 3 | 4 | 8 |

TABLE 1-continued

| n(j) | n(k) | m(i) |
|------|------|------|
| 3    | 5    | 9    |
| 4    | 5    | 10   |

The association of end point indexes illustrated in Table 1 is therefore of particular use to describe an edge-to-edge network. In edge-to-edge networks, point-to-point links 1304 might be completely confined to a particular access network, or individual point-to-point links 1304 might also traverse the regional or metro networks associated with the access network. In some instances, one or more point-to-point links 1304 might form a nationwide link traversing the backbone optical network. In many instances, a primary optical link carries the intended signal most of the time. The connection of the primary optical link might also have one or more secondary links that are used for redundancy, such as in case of transmission failures. Furthermore, the primary optical link may include a plurality of optical transport segments, and each such optical transport segment may have a different level of redundancy. Redundancy in the backbone portion of the network might be generally available, whereas redundancy in the access portion of the network might not be available, or only available at additional cost.

Figure 14:
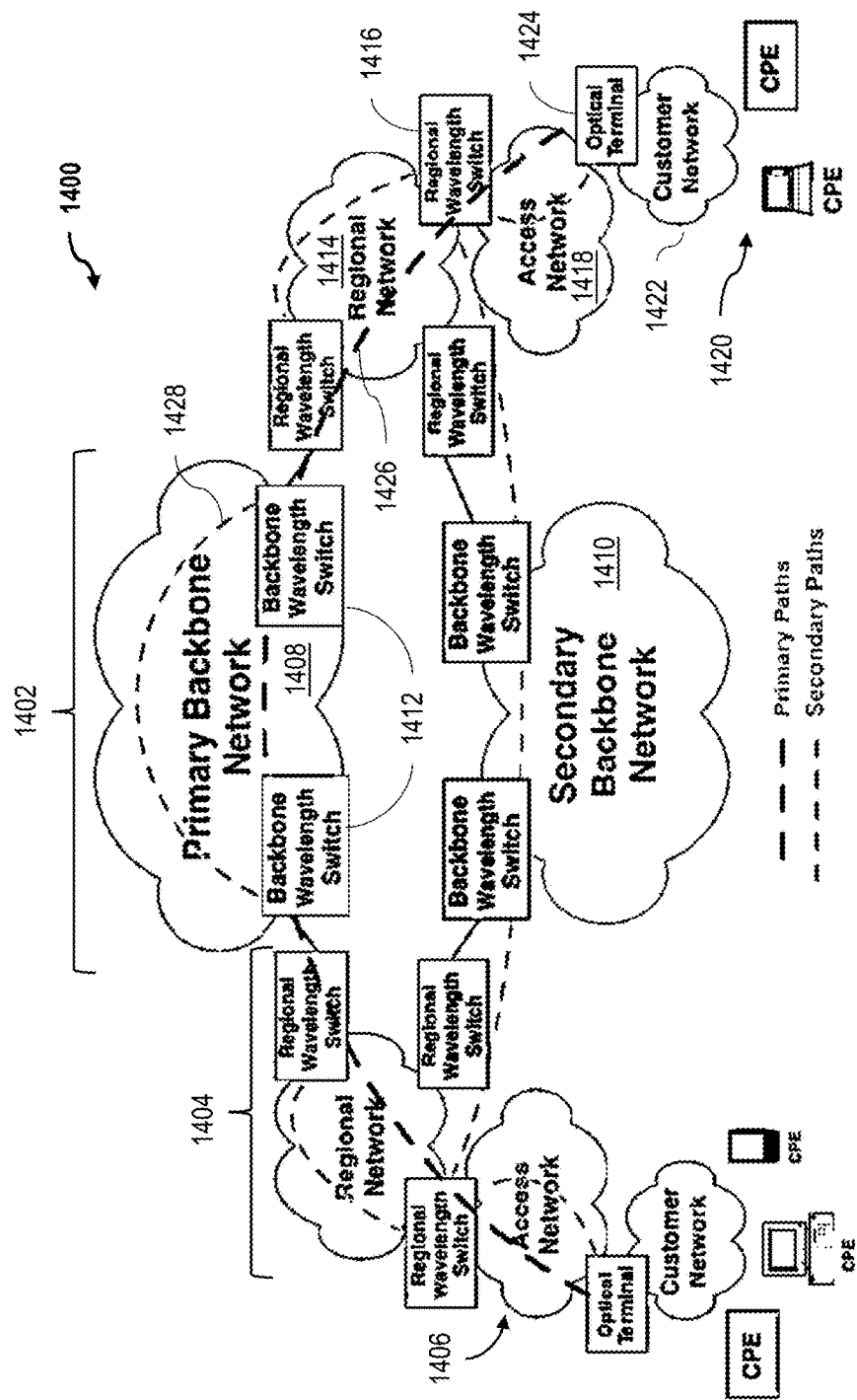
FIG. 14 is a schematic illustration of an exemplary architecture for an end-to-end fiber infrastructure, in accordance with an embodiment.

FIG. 14 is a schematic illustration of an exemplary architecture 1400 for an end-to-end fiber infrastructure. In an exemplary embodiment, architecture 1400 includes a backbone portion 1402, a regional portion 1404, and an access portion 1406. Backbone portion 1402 may, for example, include a primary backbone network 1408 and a secondary backbone network 1410, as well as a plurality of respective backbone wavelength switches 1412. Regional portion 1404 may, for example, include one or more regional networks 1414, as well as a plurality of respective regional wavelength switches 1416. Access portion 1406 may, for example, include one or more access networks 1418. In the exemplary embodiment, customer premises equipment 1420 connects to an access network 1418 through a customer network 1422, which may include one or more optical terminals 1424. In some embodiments, architecture 1400 includes a primary path 1426, and a secondary path 1428.

In the cable environment, access portion 1406 of architecture 1400 serves as the optical transport network between the hub or headend (see FIG. 15, not shown in FIG. 14) and the subscriber (e.g., customer premises equipment 1420) at the edge, or end-point, of the optical link. The hub/headend thus becomes the network location where the optical signals transition from access network 1418 to regional or metro networks 1414. Conventional access cable environments have been running fiber from the hub to an HFC fiber node (see FIG. 15, not shown in FIG. 14). According to the present embodiments though, fiber runs may be advantageously extended beyond the particular fiber node, such as to a business subscriber, a base station, or a residential subscriber. Connectivity between hub and node is described further below with respect to FIG. 15.

Figure 15:
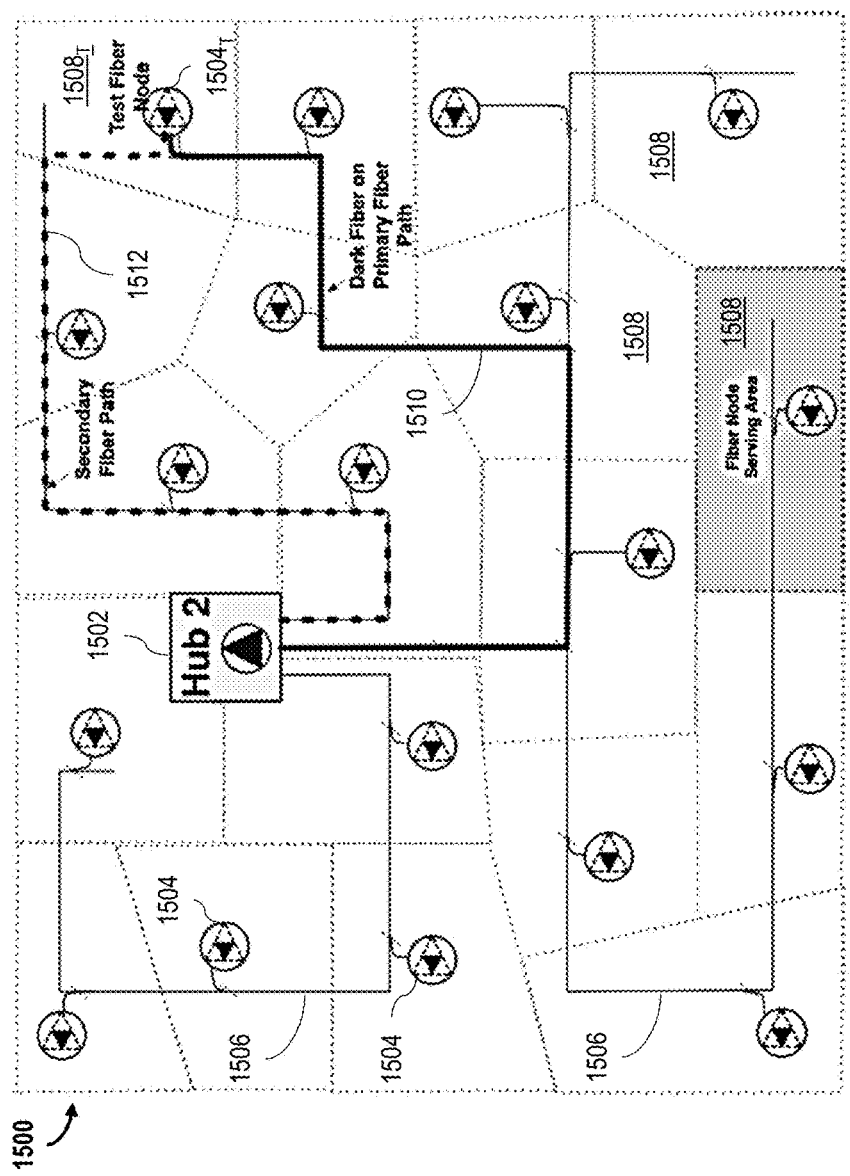
FIG. 15 is a schematic illustration of an exemplary hub and fiber access distribution network, in accordance with an embodiment.

FIG. 15 is a schematic illustration of an exemplary hub and fiber access distribution network 1500. In the example illustrated in FIG. 15, network 1500 includes an optical hub 1502 connected to a plurality of optical fiber nodes 1504 over optical fibers 1506. In the exemplary embodiment, there is at least one fiber node 1504 for each fiber node serving area 1508. Fiber communication system 300 (FIG. 3), for example, may represent a detailed schematic embodiment of a particular fiber node serving area 1508. As further illustrated in FIG. 15, a particular one of optical fiber nodes 1504 (i.e., test fiber node $1504_T$ in FIG. 15) is connected to optical hub 1502 by both a primary fiber path 1510 and a secondary fiber path 1512.

In the exemplary embodiment, fiber node serving area 1508 represents a legacy HFC network that has been upgraded to a fiber deep architecture, as described above in greater detail with respect to FIG. 3, including at least one ODC 304 for each serving area 1508 (depicted in greater detail, for example, as ODC 404, FIG. 4). In the example illustrated in FIG. 3, it can be seen that particular fiber segments, from the legacy HFC fiber nodes (e.g., fiber deep nodes 306) to hub 302, re-use existing legacy fiber infrastructure. Fiber segments 312, from ODC 304 to end-points (i.e., end users 308) at the edge of the optical network, thus continue to be installed as traffic consumption increases, thereby adding a significant number of fiber strands to traverse the new portions (e.g., the last mile) of the optical network. As these new fiber segments 312 appear, individual end users/subscribers at the edge of the network are provided with respective dedicated fibers, and ODC 304 is optimally disposed at the subscriber location closest to where wavelength and fiber management occurs (i.e., wavelength routing and fiber switching). In the case where fiber segments 312 have already been installed in this last portion of the network (e.g., RFoG and EPON deployments), and where there may be limited fiber resources available to an increasing density of subscribers, additional wavelength multiplexing can be implemented.

In some embodiments, the selection of a wavelength, for dedication to a particular fiber that connects a particular end user 308, may be achieved by manually connecting the appropriate wavelength de-multiplexer output to the appropriate fiber strand (e.g., downstream short fiber 412) that transmits to the given end user/subscriber 308/406. In an alternative embodiment, such functionality may be performed automatically, for example, by implementation of a controllable non-blocking optical switch (e.g., optical switch 448, FIG. 4), such that a desired de-multiplexing port can, on command, be matched to the desired subscriber fiber (e.g., short fiber 412).

Figure 16A:
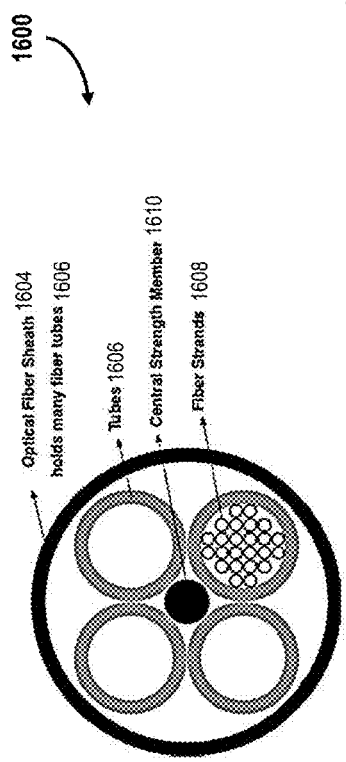
FIGS. 16A-B illustrate sectional views of an exemplary fiber sheath and fiber conduit, respectively, in accordance with an embodiment.
Figure 16B:
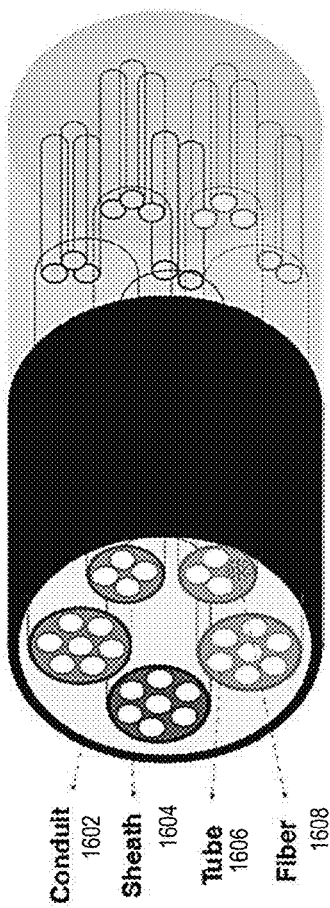

FIGS. 16A-B illustrate sectional views of an exemplary fiber cable 1600 and fiber conduit 1602, respectively. Fiber cable 1600 includes, for example, a fiber sheath 1604 surrounding a one or more fiber tubes 1606, with each fiber tube 1606 including a plurality of fiber strands 1608. In some embodiments, fiber cable 1600 further includes a central strengthening member 1610 disposed along the length of fiber sheath 1604. Optical fiber tubes 1606 are generally deployed in bundles within a cable carrying a plurality fibers, typically in multiples of 12 (e.g., 12 or 24 fiber strands 1608). These fibers are terminated with connectors (not shown) that reside in a cabinet or a termination box (also not shown), or are spliced (e.g., fusion splicing) to continuing fibers that extend the length of a fiber segment. In some cases, a few fibers are peeled off from the bundle to connect to a lower fiber count cable (not shown). In at least one embodiment, an external messenger cable (not shown) is provided when utilized in aerial plants, where a sheath (or multiple sheaths) of fiber may be stranded between utility poles from splicing point to splicing point.

In other examples, fiber cable 1600 is deployed in aboveground or underground conduits, such as fiber conduit 1602, illustrated in FIG. 16B. Fiber conduit 1602 includes, for example, a plurality of sheaths of fiber cable 1600, FIG. 16A. In this example, individual fiber cables 1600 within fiber conduit 1602 contain differing amounts of fiber tubes

1606. According to the present systems and methods, the optical network is configured to be capable of managing the numerous fibers deployed throughout the optical network, as well as the respective wavelengths dedicated thereto. That is, the present embodiments are advantageously capable of implementing techniques to identify each fiber sheath 1604 within fiber conduit 1602, each fiber tube 1606 within the identified fiber sheaths 1604, and each fiber strand 1608 within the identified fiber tubes 1606.

In conventional practice, a color coding scheme is used to identify fibers within a 12- or 24-bundle of fiber strands 1608 within a fiber tube 1606. This conventional color coding scheme labels label each fiber with a 1-to-12 or 1-to-24 number. A different color coding scheme is also conventionally known to identify fiber tubes 1606 within fiber sheath 1604. In the example fiber conduit 1602 illustrated in FIG. 16B, if it is assumed that 24 fiber strands 1608 for each fiber sheath 1604, fiber conduit 1602 will include three fiber sheaths 1604 having 144 fiber strands 1608, and four fiber sheaths 1604 having 96 fiber strands. The present systems and methods may be advantageously configured to separately identify individual fiber strands 1608, and/or identify fiber strands 1608 according to these conventional color coding schemes. Once fiber strands 1608 are identified, the present network is further configured to identify wavelength in channel parameters, as illustrated below with respect to FIG. 17.

Figure 17:
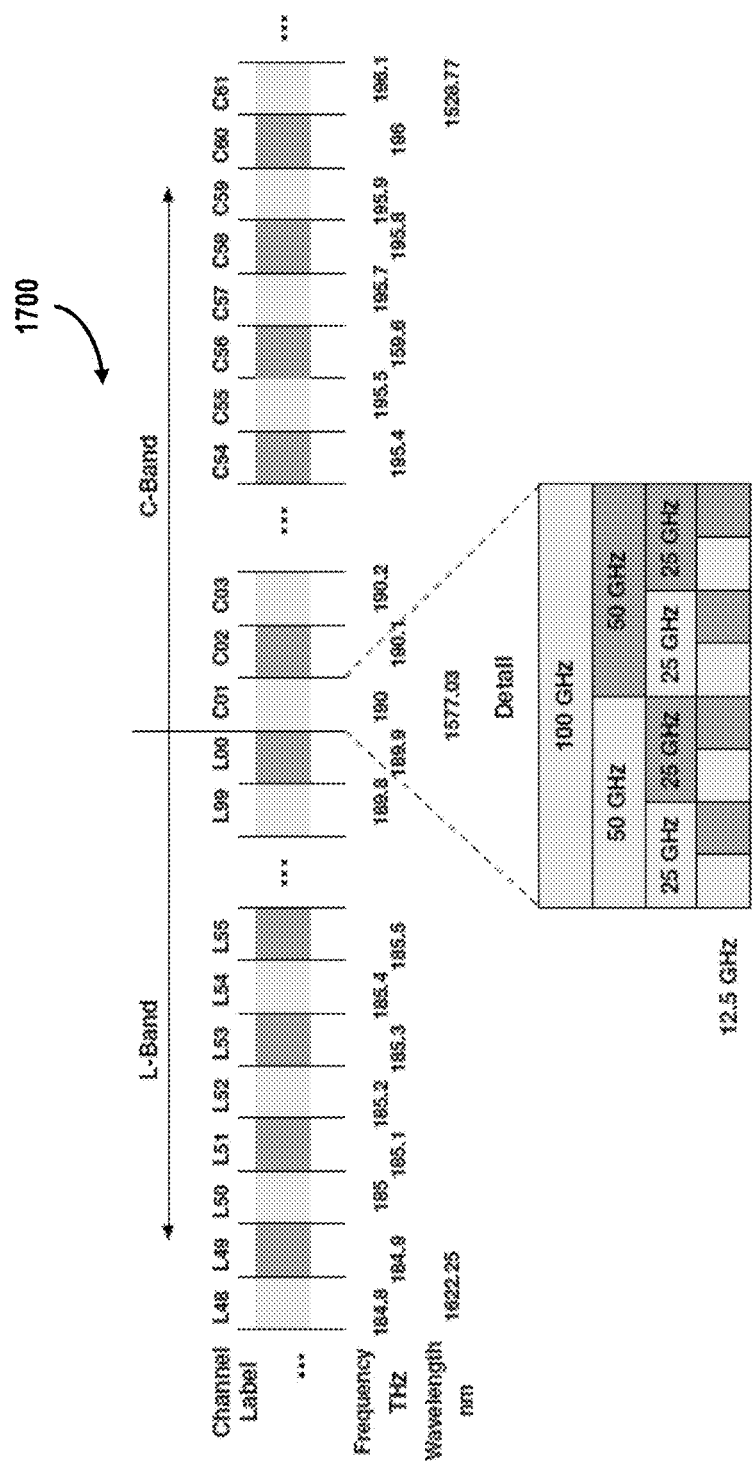
FIG. 17 illustrates an exemplary channel map of a portion of the C-Band and L-band, in accordance with an embodiment.

FIG. 17 illustrates an exemplary channel map 1700 of a portion of the C-Band and L-band. In the exemplary embodiment, individual channels of the C-Band and L-Band are according to ITU-T G.694.1. Channel map 1700 illustrates the identification of wavelength usage in each fiber segment, according to a determination of the availability of particular optical transmission bands. Portions of the C-Band and L-Band are illustrated in FIG. 17 for purposes of explanation. The C-band, for example, is considered a premium usage band because it can leverage amplification through EDFAs. In this example, the L-Band is shown to be available, but may only be desirable for use where amplification is not necessary.

O-band optical carriers (e.g., 1310 nm, not shown in FIG. 17) may be used in the access portion of the network (e.g., access portion 1406, FIG. 14), but these carriers are not likely to be used to provide end-to-end services, since they are generally limited to legacy services. Nevertheless, the present embodiments may further advantageously consider the O-band carriers in the processes and subprocesses described further below. The consideration of these additional carriers allows the present embodiments to more efficiently filter out the portion of the spectrum relating to these carriers, and to further accurately assess the impact that the optical power there from will have on other optical carriers (see FIGS. 6-7, above) utilizing the same fiber.

In managing the identified wavelengths and channels (e.g., FIG. 17) for the identified fiber strands (e.g., fiber strands 1608, FIG. 16), the present embodiments further configured to advantageously a variety of optical switches, wavelength demultiplexers, multiplexers, and ROADMs. For example, as illustrated with respect to FIG. 4, ODC 404 is described to utilize an optical switch or an N×N non-blocking optical switch. Additionally, or alternatively, ODC 404 may be configured to implement demultiplexers having a single-fiber input and an output across a plurality of fibers on different wavelengths, and/or multiplexers that input many fibers on different wavelengths and a single-fiber output.

In at least some embodiments, the present embodiments utilize a reconfigurable optical add-drop multiplexer (ROADM). Such ROADM implementations may, for example, utilize only a single drop-port or a single add-port for each demultiplexer or multiplexer therein, but may alternatively utilize a plurality add- and/or drop-ports. In the case where a plurality add- and/or drop-ports are utilized, the respective additional wavelengths (or colors) would be missing from the bypass section of the ROADM. In an embodiment, the ROADM may be implemented with a single layer, or include multiple layers having internal optical fiber switches to manage the multiple-fibers-in and multiple-fibers-out. Such internal optical fiber switches may be, for example, implemented on a wavelength level. That is, a wavelength selective switch may be based on MEMS, Liquid Crystal, or Liquid Crystal over Silicon structures.

Figure 18:
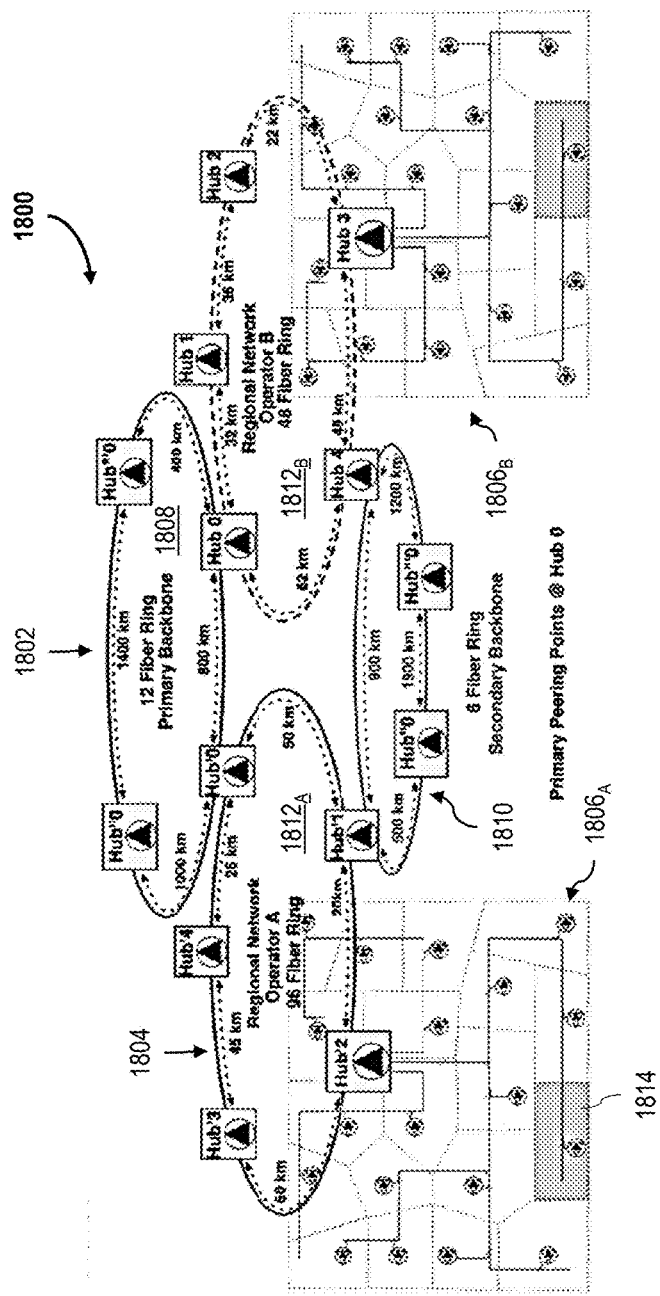
FIG. 18 is a schematic illustration of an exemplary topology of a cable-based end-to-end fiber infrastructure, in accordance with an embodiment.

FIG. 18 is a schematic illustration of an exemplary topology 1800 of a cable-based end-to-end fiber infrastructure. In overall structure, topology 1800 is similar to architecture 1400, FIG. 14, above, and includes a backbone portion 1802, a regional portion 1804, and an access portion 1806. Backbone portion 1802 may include a primary backbone 1808 and a secondary backbone 1810. In this example, primary backbone 1808 is illustrated to be a 12-fiber ring, and secondary backbone 1810 is illustrated to be a 6-fiber ring. Further to this example, regional portion 1804$_A$ is illustrated to be a regional network 1812$_A$ (operator A) 96-fiber ring, where as regional portion 1804$_B$ is illustrated to be a regional network 1812$_B$ (operator B) 48-fiber ring. Access portions 1806(2) and 1806(3) are each similar to the general topology of access network 1500, FIG. 15 (finer details of HFC node serving area not shown in FIG. 15).

In this exemplary embodiment of the present disclosure, an intelligent configuration capability establishes a signal connectivity between respective two end points, and by leveraging such information as: (A) knowledge of the capabilities of the respective end devices; (B) knowledge and control of wavelength occupancy (e.g., FIG. 17) in the fiber strands (e.g., FIG. 16) available between two end points within the fiber network routes; and (C) through leveraging the control, configuration, and connectivity of individual optical transmission components, as described above, and further below. Accordingly, a detailed, cable-specific example of topology 1800 is illustrated for the edge-to-edge cable infrastructure of FIG. 18.

In an exemplary embodiment of topology 1800, a wavelength is provisioned from a subscriber (e.g., end user 308, FIG. 3) in node serving area 1814$_A$ (i.e., shaded area, in this example), within the Hub '2 of access portion 1806$_A$, and sent to an end user in node serving area 1814$_B$ (separately shaded) within Hub 3. Accordingly, the primary path of the provisioned wavelength traverses Hub'2, Hub '3, Hub '4, and Hub '0 from regional network 1814$_A$ of operator A, connects to Hub 0 through primary backbone 1808 and then traverses 1, Hub 2, and Hub 3 in regional network 1814$_B$ of operator B before reaching the node where the end subscriber is located. The secondary wavelength path traverses Hub '2 and Hub '1 from regional network 1814$_B$ of operator A, connects to Hub 4 through secondary backbone 1810, and then traverses Hub 3 in regional network 1814$_B$ of operator B, before reaching the node within Hub 3 where the end subscriber is located.

Figure 19:
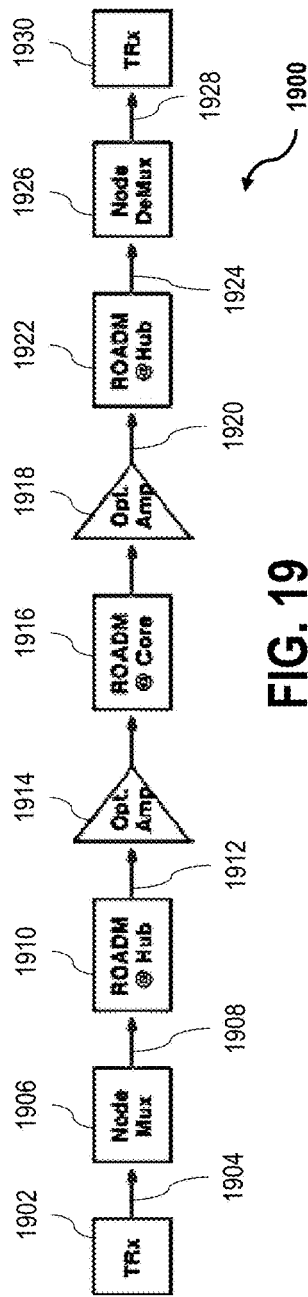
FIG. 19 is a block diagram of an exemplary sequence of components traversed by optical signals, in accordance with an embodiment.

FIG. 19 is a block diagram of an exemplary sequence 1900 of components traversed by optical signals of selected or desired wavelengths. Sequence 1900 may include, for example, one or more of a origin transceiver 1902, a first origin access fiber segment 1904 (e.g., for the first/last mile), an origin node multiplexer 1906, a second origin access fiber segment 1908, an origin hub ROADM 1910, an origin core fiber segment 1912, an origin optical amplifier 1914, a core ROADM 1916, a destination optical amplifier 1918, a destination core fiber segment 1920, a destination ROADM 1922, a first destination access fiber segment 1924, a destination node demultiplexer 1926, a second destination access fiber segment 1928 (e.g., for the last/first mile), and a destination transceiver 1930.

In exemplary operation of the sequence 1900, key parameters of the transmitted optical signals are managed, according to the embodiments described above, so that the wavelengths of the optical signals of different carrier types may coexist sharing the common fibers. These key parameters may include the transmit power, the modulation type (coherent or non-coherent), the modulation order, the modulation bandwidth or symbol rate, and the wavelength or center frequency. In at least some embodiments, emission in adjacent channels and/or other channels is also a key parameter that are also managed to optimize the coexistence of different carrier types transmitted on the same fiber.

Figure 20:
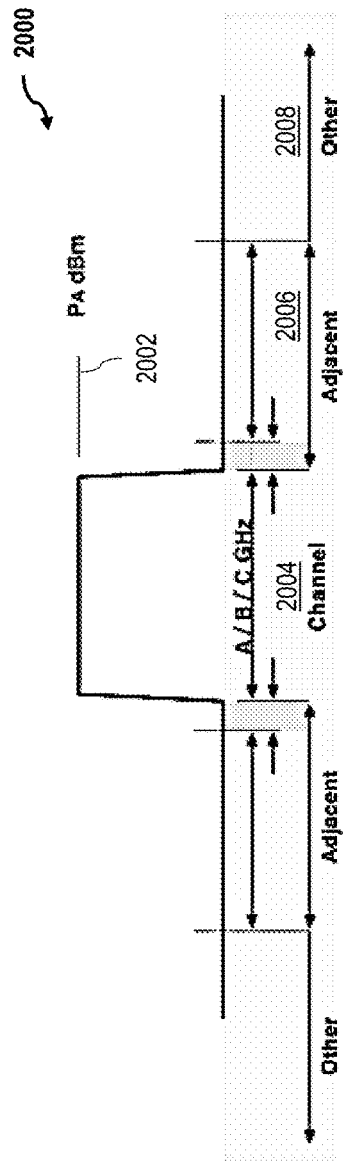
FIG. 20 is a graphical illustration depicting an exemplary power management distribution, in accordance with an embodiment.

FIG. 20 is a graphical illustration depicting an exemplary power management distribution 2000. Distribution 2000 emphasizes how a maximum peak power 2002 can be managed for a particular transmit channel 2004. Distribution 2000 further illustrates how maximum allowable energy may be defined outside of transmit channel 2004, for example, in adjacent channels 2006 and other channels 2008 in the wavelength spectrum. Through this illustrative distribution 2000, the person of ordinary skill in the art may more readily determine techniques to manage the power and unwanted noise emissions across wavelength spectrum, to optimize the use of fiber resources. In the exemplary embodiment, these parameters may be further managed, according to the embodiments herein, to optimize transmission noise emission performance requirements for wavelength service subscribers, such that the subscribers may adhere to particular service-level agreements (SLAs).

Distribution 2000 illustrates optimal management of restrictions based only upon the wavelength or center frequency of the channel, as well as its immediate environment. Nevertheless, the present embodiments are further capable of advantageously managing the optimal placement of different carrier types within the same fiber in consideration of additional restrictions, such as where the transmitted signal originates. The signal origin may be an important consideration factor because certain portions of the network, such as the backbone portion, would likely require different optimization considerations than other portions of the network, since the backbone portion would typically be considered to have greater value than the access portion or the regional/metro portion of the network. Table 2, below, lists examples of the maximum launch power per channel at the access portion of the network, versus the maximum launch power per channel at the metro and backbone portions of the network. Thus, as shown in Table 2, the launch power may experience different restrictions based on where the signal originates.

TABLE 2

| Ch. Launch Power at Access | Ch. Launch Power at Metro/Backbone |
|---|---|
| 200 GHz + 6 dBm | 200 GHz + 3 dBm |
| 100 GHz + 3 dBm | 100 GHz 0 dBm |
| 50 GHz 0 dBm | 50 GHz − 3 dBm |

TABLE 2-continued

| Ch. Launch Power at Access | Ch. Launch Power at Metro/Backbone |
|---|---|
| 25 GHz − 3 dBm | 25 GHz − 6 dBm |
| 12.5 GHz − 6 dBm | 12.5 GHz − 9 dBm |

As can be seen from Table 2, optical power in the metro and backbone portions of the network are lower than the optical power in the access portion of the network, so that a greater number of channels the is allowed, with fewer unwanted emissions, along the fiber wavelength spectrum in the portions of the network where it is most the desirable to optimize for capacity. In at least some embodiments, in addition to the individual optical signal parameters considered above, the present embodiments are still further capable of factoring into the carrier coexistence determinations aggregate fiber parameters, such as the maximum aggregate optical power. That that is, present techniques may further advantageously factor in the additive effect of all signals transmitted within a particular fiber to prevent non-linear behavior of the fiber, which could impact the overall capacity in a fiber strand.

In order to optimize capacity in a shared fiber environment, the present systems and methods implement innovative and precise management techniques of the parameters of the different optical carrier types. From the perspective of subscribers that use their own optical transmitters, such subscriber transmitters would be required to adhere to a Carrier Coexistence Agreement (CSA) that operates in cooperation with the principles described herein. In the case where the service provider has control of the transmitters, the service provider would also be required to obey the configuration thresholds of the same CSA, thereby allowing the service provider to enable SLAs when providing end-to-end wavelength services.

The innovative techniques of the present embodiments further enable development of optimal wavelength service provisioning strategies to identify and more efficiently utilize wavelength resources, such that a service provider, for example, is able to more accurately charge the subscriber for services based on the implementation complexity, performance, and/or cost of the services. That is, through the novel technical solutions presented herein, less guesswork is required to estimate service costs per subscriber, per fiber node serving area, or per access network.

Although, in theory, there might be numerous options to use any wavelength in the C-Band and L-Band, in practice, there are particular considerations that must be factored into the availability and use of transmitters and receivers at the different wavelengths of these bands. Additionally, other considerations, such as the need for amplification (e.g., by EDFAs), or that EDFAs are not available in the L-Band, must also be weighed. At present, conventional non-coherent transmitters and receivers are less costly than coherent transmitters and receivers. However, because coherent signals can be efficiently packed in a comparatively very small bandwidth in relation to the non-coherent signals, utilization of the coherent technology described herein significantly improves the efficiency of utilizing existing fiber resources. Accordingly, the reduction in the need for retrenching, resulting from the increased efficiency achieved from coherent technology, will significantly outweigh the increased cost of the individual coherent transmitters and receivers that are used to implement the technology. These cost benefits are realized even if the relative cost of the coherent components does not decrease over time with respect to their non-coherent counterparts (which is nevertheless anticipated).

These efficiency benefits are particularly advantageous two operators in the cable environment, since the present cable operators typically have significant penetration of fiber, but only a limited number of fiber strands available for further expansion. Therefore, although non-coherent wavelength services may be initially considered to exhibit lower end point costs (e.g., from less expensive hardware components), operation of the non-coherent wavelength services to the end point will be, in fact, more costly overall, due to the considerably greater bandwidth and power resources consumed by the non-coherent technology. Several of the algorithms described further below specifically demonstrate how, in many scenarios, it is more cost effective to implement wavelength services using the coherent systems and methods described herein, as compared with conventional non-coherent technologies.

As described above, coherent optical links have greater sensitivity than non-coherent optical links, and comparatively require only very low transmit power. As also described above, the maximum aggregate power in a fiber is a key parameter to evaluate, as a capacity-limiting phenomenon, due to the non-linear behavior that may result from overpowering the fiber. This sensitivity advantage experienced by coherent links further enables transmissions over longer distances without additional amplification, thereby further reducing the hardware costs using coherent technology.

As described above with respect to FIG. 17, channel map 1700 includes portions of the C-Band and the L-Band. As described further herein, a criteria and techniques of wavelength mapping and selection are provided to more efficiently allocate the channels of an available spectrum, such as some or all of the channels illustrated in channel map 1700. Typically, the access network will be expected to have limited fiber strands available from the Hub to the node. Nevertheless, it may be assumed that, because new fiber must be installed from the node to each new subscriber, sufficient fiber resources will be available for this last node-to-subscriber segment.

It is further expected that limited fiber resources are available from Hub-to-Hub, as well as in the backbone portion of the network. That is, the backbone portion, which includes the longest distance links, has limited fiber resources, and is the portion of the network that is more carefully managed and is most likely to include amplification stages. A provider's regional networks may have greater fiber availability than would their backbone portion, but the provider might also have a variety of optical technologies using those additional resources. The utilization of all such resources influences the cost and performance to provide wavelength services. Accordingly, the wavelength selection strategy of the present techniques is further advantageously configured to consider the effect on the network and fiber wavelength distribution from these other resources.

For wavelength services that traverse shorter distances there may not be a need for amplification. In such instances, that is, for services that might traverse only the access portion or the access network and a shorter path through a few hubs, the wavelength selection strategy might only allocate the L-Band and a smaller portion of the C-Band. However, for longer distance transmissions, where multiple hubs or a portion of the backbone are traversed, the C-Band, which has amplification capabilities, might be more optimally allocated.

The present systems and methods are therefore configured to implement a comprehensive database to perform resource analysis and cost factoring. The comprehensive database encompasses information regarding the available fiber resources from end-to-end, as well as the wavelength allocation per fiber segment. Accordingly, even if certain portions of the wavelength spectrum are unused, certain wavelengths may be nevertheless reserved for services that are often used by operators. Such reserved wavelengths might represent those typically used in EPON, Gigabit Ethernet, analog optics, and other signals, for example. Thus, the comprehensive database may include a detailed wavelength channel map (e.g., channel map 1700, FIG. 17), as well as information for additional optical signal attributes including one or more of the type of signal, the modulation order, the bandwidth or symbol rate, the transmit power at source, the peak optical power in fiber segment, in the center frequency or wavelength, etc.

A significant attribute of the fiber segment to consider is the cost factor per optical signal in that segment. Factors that contribute to this cost factor include such considerations as the scarcity of wavelengths and bandwidth in that segment, the center frequency, and the band associated with that center frequency. Additionally, L-Band channels are considered at present to be less expensive than C-Band channels, due to the lack of amplification in the L-Band. Another significant cost factor to consider is the launch power. Since there is non-linear behavior induced by high aggregate optical power within a fiber strand, in at least one embodiment, the present techniques address this limitation by imposing a threshold above which a cost premium is added to transmit near, at, or above this threshold value.

The present techniques further, in an embodiment, determine that flexible wavelength end points exhibit lower operating costs, since the operator is able to re-arrange the wavelengths to accommodate services for other subscribers. Fixed wavelengths are thus more restrictive. Accordingly, if a subscriber is buying fixed wavelength services, the operator may then analyze the available end-to-end wavelength options and provide the potential subscriber with a list of potential wavelengths to use. Table 3 illustrates a list of fiber traversal cost elements based on the length and the section of the network being utilized. Table 3A illustrates the cost elements with respect to utilization of one's own network fiber, and Table 3B illustrates the cost elements with respect to utilization of a peered network fiber.

TABLE 3A (Own Fiber)

| Fiber Segment | Cost |
| --- | --- |
| Backbone | fb(L) |
| Regional | fr(L) |
| Access | fa(L) |

TABLE 3B (Peered Fiber)

| Fiber Segment | Cost |
| --- | --- |
| Backbone | p * fb(L) |
| Regional | p * fr(L) |
| Access | p * fa(L) |

Table 4 illustrates a list of sample node traversal cost elements based on the length and the section of the network being utilized. Table 4A illustrates the per node cost in one's own network, and Table 4B illustrates the per node cost in the peered network. In some embodiments, the access node, which is the gateway to the region, is considered to be a regional network node from a cost perspective, even though the access node is effectively at the regional boundary. Similarly, a regional node functioning as the gateway to the backbone portion (i.e., at the backbone boundary) is considered to be a backbone network node from a cost perspective.

TABLE 4A (Own Network)

| Node | Cost |
|---|---|
| Backbone Network Node | nb |
| Regional Network Node (not in Backbone boundary) | nr |
| Access Network Node (not in Regional boundary) | na |

TABLE 4B (Peered Network)

| Node | Cost |
|---|---|
| Backbone Network Node | p * nb |
| Regional Network Node (not in Backbone boundary) | p * nr |
| Access Network Node (not in Regional boundary) | p * na |

Table 5 illustrates a list of sample bandwidth cost factors based on the length and the section of the network being utilized. Table 5A illustrates the bandwidth cost in one's own network, and Table 5B illustrates the bandwidth cost in the peered network. Although amplification may be included in the backbone portion of the network, if amplification is desired in other portions of the network, such as the regional portion of the network, additional cost are added to the determinations illustrated below. In an exemplary embodiment, the present techniques implement a channel selective amplification system utilizing ROADMs together with EDFAs. However, other hardware configurations are contemplated, as described above.

TABLE 5A (Own Network)

| Segment | Cost Factor |
|---|---|
| Backbone Network | g(bw) |
| Regional Network Node | g'(bw) |
| Access Network Node | g''(bw) |

TABLE 5B (Peered Network)

| Segment | Cost Factor |
|---|---|
| Backbone Network | g(bw) |
| Regional Network Node | g'(bw) |
| Access Network Node | g''(bw) |

TABLE 5B-continued (Peered Network)

| Segment | Cost Factor |
|---|---|

According to the present systems and methods, wavelength services are advantageously performed utilizing fully automated wavelength multiplexing techniques, together with optical switching technology. Additionally, or alternatively, the present embodiments are implemented in nearer physical proximity to the network edge, where fewer changes are expected over time. In some embodiments, the present systems and methods may further implement manual fiber connectivity and manual selection of specific wavelength de-multiplexers as an optional complementary technique with portions of the embodiments disclosed herein. At the core or backbone portion of the network, frequent changes and fiber manipulations are expected, and therefore a fully automated system is anticipated at such locations to maximize the efficiency of the present systems and methods. Some of manual operations at the backbone/core are possible within the scope of the present application, but are generally considered less desirable.

An optimal methodology to provide wavelength services is described with respect to the flow diagrams illustrated in FIGS. 21-23, below. The exemplary processes and subprocesses described therein summarize particular criteria and cost assessments that are applied to the technology of the different portions of the network to provision wavelength connectivity services and thereby maximize efficiency.

Figure 21:
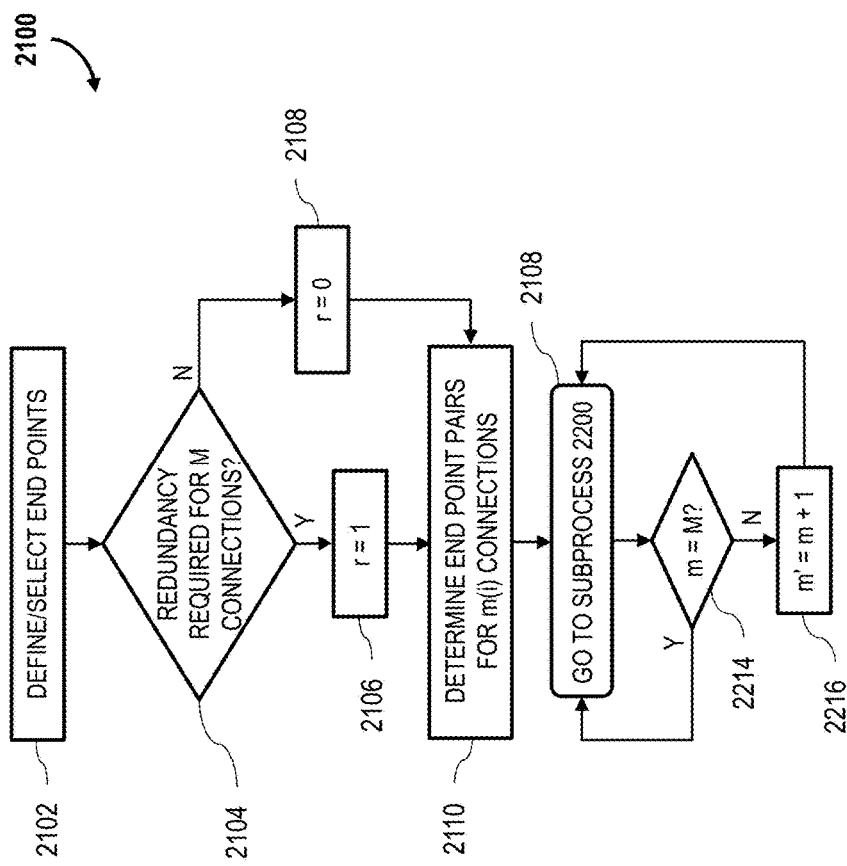
FIG. 21 illustrates an exemplary point-to-point network provisioning process, in accordance with an embodiment.

FIG. 21 is a flow chart diagram of an exemplary point-to-point network provisioning process 2100 that may be implemented with the embodiments described above. Provisioning process 2100 may be implemented by a processor of a wavelength-based point-to-point network provisioning system, disposed, for example, within an optical hub of the network. Alternatively, the network provisioning system may be located in, or operate from, another portion of the optical communications network. Process 2100 begins at step 2102. In step 2102, process 2100 defines or selects all n(j) end points of the desired point-to-point network. For a quantity N of end points, there are a total of M connections, as represented by the following equation:

$$M = \binom{N}{2} \quad \text{(Eq. 1)}$$

Step 2104 is a decision step. In step 2104, process 2100 determines if redundancy is required for all M connections. If redundancy is required, process 2100 proceeds to step 2106, and sets a redundancy value r=1. If, in step 2104, process 2100 determines that redundancy is not required, process 2100 proceeds instead to step 2108, where the redundancy value is set to r=0. In step 2110, process 2100 determines, for all (n(j), n(k)) end point pairs, all m(i) connections (see e.g., Table 1, for N=5), and sets the value m=1.

In step 2112, process 2100 executes wavelength and fiber path selection subprocess 2200, described below with respect to FIG. 22. After completion of subprocess 2200, process 2100 proceeds to step 2114. Step 2114 is a decision step. In step 2114, process 2100 determines if m=M. If, in step 2114, process 2100 determines that m=M, process 2100 concludes, or optionally returns to subprocess 2200 to reevaluate the system. If, however, in step 2114, process 2100 determines that m≠M, the value m is incremented such that m'=m+1, and process 2100 then returns to step 2112 and repeats subprocess 2200 (e.g., at least until m=M).

Figure 22:
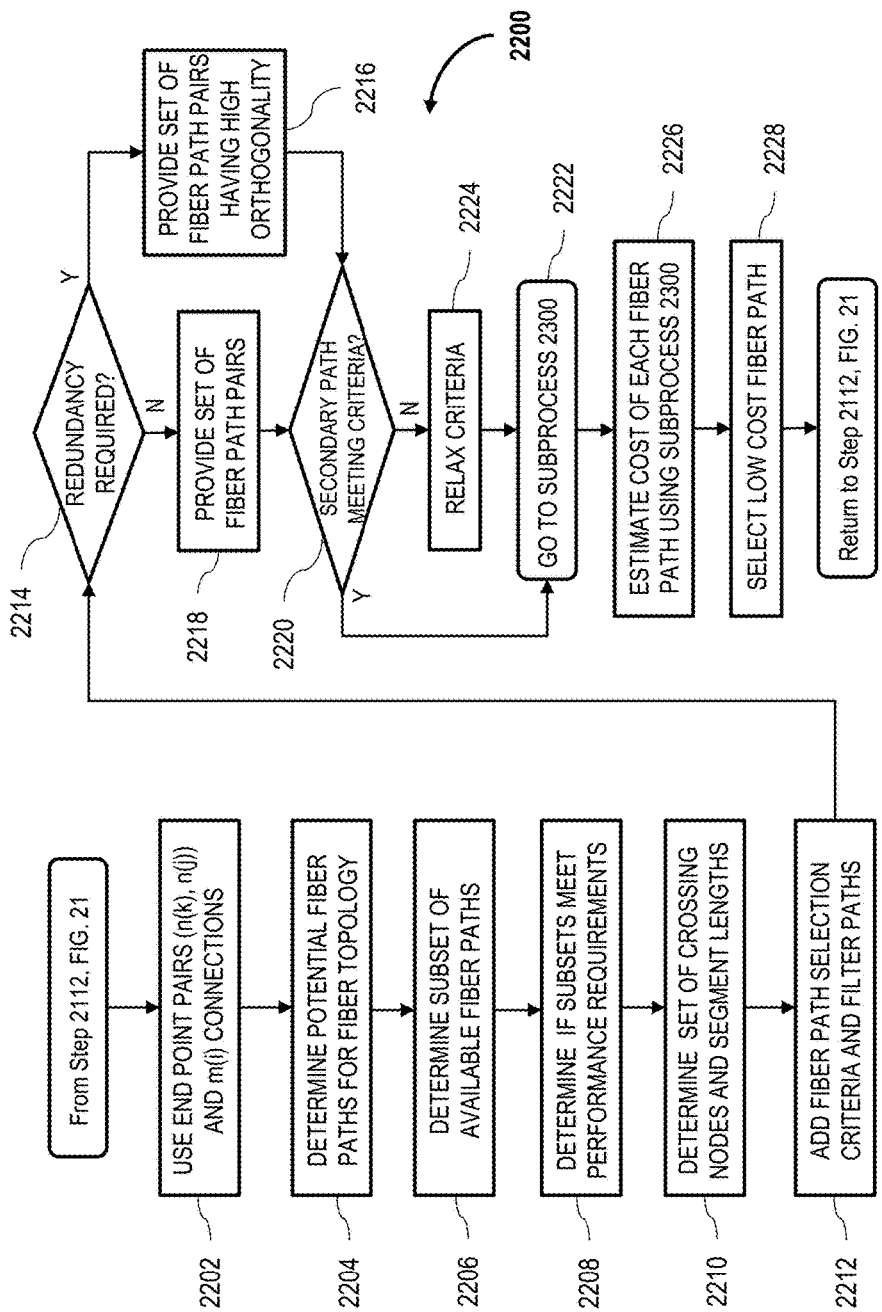
FIG. 22 is a flow chart diagram of an exemplary wavelength and fiber path subprocess that may be implemented with the provisioning process depicted in FIG. 22.

FIG. 22 is a flow chart diagram of an exemplary wavelength and fiber path subprocess 2200 that may be implemented with provisioning process 2100, FIG. 21. In the exemplary embodiment, wavelength and fiber path subprocess 2200 is implemented with respect to at least a single optical link between two end points (see e.g., FIG. 13, above).

Subprocess 2200 begins at step 2202, in which subprocess 2200 indexes, or retrieves an index (e.g., Table 1, above) of, the (n(j), n(k)) pairs of end points and the corresponding m(i) connections/associations. In step 2204, subprocess 2200 implements algorithms, e.g., mesh topology path discovery algorithms, to determine a set of all potential fiber paths between end points within the fiber topology (e.g., topology 1900, FIG. 19). In step 2206, subprocess 2200 determines a subset of available fiber paths between end points based on the available wavelengths on every fiber segment of each potential fiber path. In step 2208, subprocess 2200 determines which subset of fiber paths meet particular performance requirements (e.g., bandwidth, latency, noise, etc.) using the bandwidth required by the point-to-point link.

In step 2210, subprocess 2200 determines, for each resulting fiber path, the set of all nodes crossed by the path, as well as a set of all such paths and their corresponding lengths. In step 2212, subprocess 2200 adds fiber path selection criteria (e.g., maximum number of nodes, maximum length, etc.) and adjusts the rate of the calculation according to the added criteria, and/or filters the set of potential fiber paths based on the added criteria. Step 2214 is a decision step. In step 2214, subprocess 2200 determines if redundancy is required (i.e., r=1, from step 2106, FIG. 21) for the particular fiber connection link being evaluated. If, in step 2214, subprocess 2200 determines that redundancy is required, subprocess 2200 proceeds to step 2216, and provides the set of fiber path pairs with a highest degree of orthogonality. In this disclosure, it is recognized that fully orthogonal paths will not share a common segment in practice.

If, however, in step 2214, subprocess 2200 determines that redundancy is not required, subprocess 2200 proceeds to step 2218, and provides the set of all fiber path pairs, and for the upstream and/or downstream directions. Step 2220 is a decision step. In step 2220, subprocess 2200 determines if at least one fiber pair path includes at least one secondary path (i.e., where r=1) meeting the path selection criteria. If at least one fiber pair path is found with a corresponding secondary path, process 2200 then proceeds to step 2222, in which subprocess 2200 executes a cost subprocess 2300, described below with respect to FIG. 23. If, however, in step 2220, a corresponding secondary path meeting the path selection criteria is not found, subprocess 2224 then proceeds to step 2224, in which the selection criteria are relaxed, in the database is updated to record the relaxed criteria, and the set of fiber paths is recalculated before proceeding on to step 2222, and execution of subprocess 2300 thereby.

In step 2226 process 2200 estimates the cost of each fiber path, based on the results obtained from cost subprocess 2300, and according to the path of selection criteria (e.g., original or relaxed) of the set. The results obtained from cost subprocess 2300 assesses, for example, the cost of each traversed node and each traversed segment, the impact of the wavelength center frequency and bandwidth, the total traversed length, etc. In step 2228, subprocess 2200 selects the fiber path or fiber path pairs, and the associated wavelength, that meet(s) the fiber path selection performance criteria at the lowest cost. Upon selection of the fiber path(s) in step 2228, subprocess 2200 returns to step 2114 in process 2100, FIG. 21.

Figure 23:
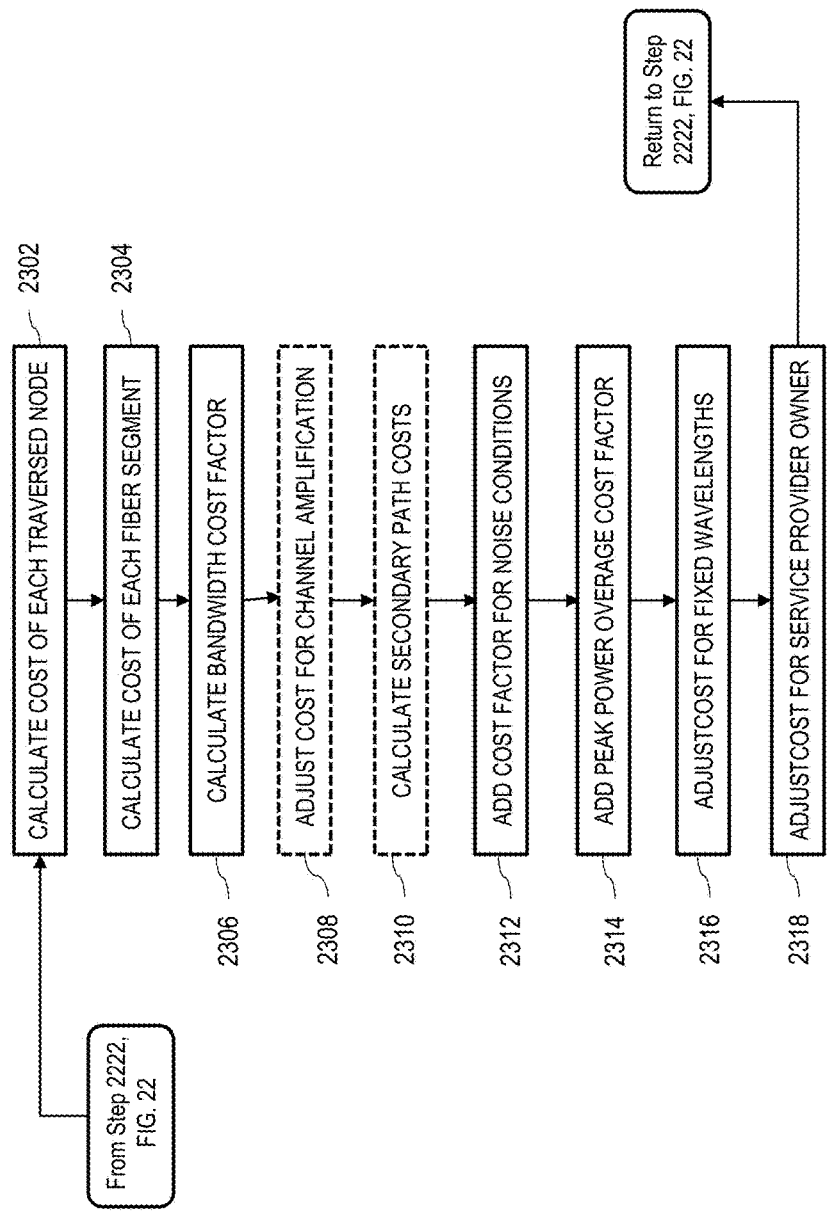
FIG. 23 is a flow chart diagram of an exemplary cost subprocess that may be implemented with the provisioning process depicted in FIG. 22 and the wavelength and fiber path subprocess depicted in FIG. 23.

FIG. 23 is a flow chart diagram of an exemplary cost subprocess 2400 that may be implemented with provisioning process 2100, FIG. 21, and wavelength and fiber path subprocess 2200, FIG. 22. Cost subprocess 2300 begins at step 2302, in which subprocess 2300 calculates the cost of each traversed node based on the node location, including the impact of whether the node is from one's own facility versus a peered facility (see e.g., Tables 4A-B). In step 2304, subprocess 2300 calculates the cost contribution of each fiber segment based on the location of the particular fiber segment, its length at a particular wavelength (e.g., C-Band vs. L-Band), and the impact of an own-versus-peered fiber (C e.g., Tables 3A-B). In step 2306, subprocess 2300 calculates the cost factor as a function of bandwidth, considering the impact of own-versus peered-facilities (see e.g., Tables 5A-B).

Step 2308 is an optional step. In step 2308, subprocess 2300 adjusts the cost calculations if channel selective amplification is needed or desired. Step 2310 is also an optional step. In step 2310, subprocess 2300 recalculates the preceding costs for a corresponding secondary path, i.e., if redundancy was required for the particular path.

In step 2312, subprocess 2300 calculates and adds at least one additional cost factor based upon the required noise conditions of the selected channel. Step 2314 is also an optional step. In step 2314, subprocess 2300 calculates and adds a further cost factor to compensate for peak power being greater than an allowed power level, if desired.

In step 2316, subprocess 2300 calculates a further cost adjustment depending on whether the transmission is a fixed-versus-configurable wavelength center frequency. In an exemplary embodiment, the further cost adjustment adds a premium value for fixed wavelength transmissions. In step 2318, a still further cost adjustment is calculated depending on whether a given end point is managed and/or owned by a service provider for which the service costs are being assessed. Upon completion of step 2318, subprocess 2300 completes, and returns to step 2226 of wavelength and fiber path selection subprocess 2200, FIG. 22.

Exemplary embodiments of fiber communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

a(i). An optical network communication system, comprising: an optical hub including an intelligent configuration unit configured to monitor and multiplex at least two different optical signals into a single multiplexed heterogeneous signal; an optical distribution center configured to individually separate the at least two different optical signals from the multiplexed heterogeneous signal; at least one fiber segment connecting the optical hub and the optical distribution center, the at least one fiber segment configured to receive the multiplexed heterogeneous signal from the optical hub and distribute the multiplexed heterogeneous signal to the optical distribution center; and at least two end users, each including a downstream receiver configured to receive one of the respective separated optical signals from the optical distribution center.

b(i). The system of claim a(i), wherein the intelligent configuration unit comprises a processor and a memory, and an optical multiplexer.

c(i). The system of claim b(i), wherein the intelligent configuration unit further comprises an optical multiplexer.

d(i). The system of claim b(i), wherein the intelligent configuration unit further comprises at least one of a control interface and a communication interface to receive from and send information to an optical multiplexer.

e(i). The system of claim a(i), wherein the optical distribution center comprises a node optical demultiplexer configured to demultiplex the multiplexed heterogeneous signal.

f(i). The system of claim a(i), wherein the optical hub comprises at least two downstream transmitters, each configured to transmit one of the at least two different optical signals, respectively.

g(i). The system of claim f(i), wherein each of the at least two end users further includes an upstream transmitter, wherein the optical distribution center further comprises a node optical multiplexer, and wherein the optical hub further comprises at least two upstream receivers configured to receive a different optical signal from different ones of the transmitters of the at least two end users, respectively.

h(i). The system of claim f(i), wherein the intelligent configuration unit is further configured to multiplex the at least two different optical signals from the at least two downstream transmitters.

i(i). The system of claim a(i), wherein the at least two different optical signals include two or more of an analog signal, an intensity modulated direct detection signal, a differential modulated signal, and a coherent signal.

j(i). The system of claim a(i), wherein the at least two end users comprise at least two of a customer device, customer premises, a business user, and an optical network unit.

k(i). The system of claim a(i), further configured to implement coherent dense wavelength division multiplexing with a passive optical network architecture.

l(i). The system of claim k(i), wherein the at least two end users include at least N subscribers, and wherein the system comprises at least two fiber segments for each N subscribers.

m(i). The system of claim a(i), further configured to implement wavelength filtering and injection locking.

n(i). The system of claim m(i), wherein the at least two end users include at least N subscribers, and wherein the system comprises at least three fiber segments for each 2N subscribers.

a(ii). A method of distributing heterogeneous wavelength signals over a fiber segment of an optical network, comprising the steps of: monitoring at least two different optical carriers from at least two different transmitters, respectively; analyzing one or more characteristics of the fiber segment; determining one or more parameters of the at least two different optical carriers; and assigning a wavelength spectrum to each of the at least two different optical carriers according to the one or more analyzed fiber segment characteristics and the one or more determined optical carrier parameters.

b(ii). The method of claim a(ii), further comprising, after the step of assigning, multiplexing the at least two different optical carriers to the fiber segment according to the respective assigned wavelength spectra.

c(ii). The method of claim a(ii), wherein the at least two different optical carriers include two or more of an analog signal, an intensity modulated direct detection signal, a differential modulated signal, and a coherent signal.

d(ii). The method of claim a(ii), wherein the fiber segment characteristics include one or more of fiber type, fiber length, implementation of amplification and/or loss devices, implementation of wavelength filters or splitters, and fiber distribution network topology.

e(ii). The method of claim a(ii), wherein the optical carrier parameters include one or more of individual carrier optical power levels, aggregate carrier power, number of optical carriers, signal wavelength, wavelength spacing among carriers, modulation format, modulation bandwidth, carrier configurability, channel coding/decoding, polarization multiplexing, forward error correction, and carrier tenability.

f(ii). The method of claim a(ii), wherein the step of assigning comprises the substeps of: first, placing fixed wavelength optical signals along a wavelength spectrum; second, place substantially robust optical signals having relatively high noise tolerance closely adjacent the fixed wavelength optical signals along the wavelength spectrum; and third, place optical signals having relatively higher signal to noise ratios within areas of relatively low noise along the wavelength spectrum, such that the substantially robust optical signals are positioned between the optical signals having relatively higher signal to noise ratios and the fixed wavelength optical signals.

g(ii). The method of claim f(ii), wherein the step of assigning further comprises the substep of calculating a noise level of placed signals after at least one of the first, second, and third substeps.

h(ii). The method of claim f(ii), wherein the fixed wavelength optical signals comprise analog optical signals.

i(ii). The method of claim f(ii), wherein the optical signals having relatively high noise tolerance comprise one or more of NRZ and QPSK optical signals.

j(ii). The method of claim f(ii), wherein the optical signals having relatively higher signal to noise ratios comprise one or more of PAM4, PAM8, 16QAM, and 64QAM optical signals.

a(iii). An optical distribution center apparatus, comprising: an input optical interface for communication with an optical hub; an output optical interface for communication with one or more end user devices configured to process optical signals; a wavelength filter for separating a downstream heterogeneous optical signal from the input optical interface into a plurality of downstream homogenous optical signals; and a downstream optical switch for distributing the plurality of downstream homogeneous optical signals from the wavelength filter to the output optical interface in response to a first control signal from the optical hub.

b(iii). The apparatus of claim a(iii), wherein the wavelength filter comprises at least one of a wavelength division multiplexing grating and a cyclic arrayed waveguide grating.

c(iii). The apparatus of claim a(iii), wherein the downstream optical switch is an N×N optical switch configured to associate particular ones of the plurality of downstream homogeneous optical signals with respective ones of the one or more end user devices.

d(iii). The apparatus of claim a(iii), wherein the first control signal is received from an intelligent configuration unit disposed within the optical hub.

e(iii). The apparatus of claim a(iii), further comprising: an upstream optical switch for distributing a plurality of upstream homogeneous optical signals collected from the output optical interface in response to a second control signal from the optical hub; and an optical combiner for aggregating the distributed plurality of upstream homogenous optical signals into a heterogeneous upstream optical signal to the input optical interface.

f(iii). The apparatus of claim e(iii), wherein the optical combiner comprises at least one of a wavelength division multiplexing grating and a passive optical splitter.

g(iii). The apparatus of claim e(iii), wherein the upstream optical switch is an N×N optical switch.

h(iii). The apparatus of claim e(iii), wherein the second control signal is a counterpart command of the first control signal.

i(iii). The apparatus of claim e(iii), wherein the optical distribution center is configured to receive the first and second control signals separately from the input optical interface.

j(iii). The apparatus of claim e(iii), further comprising a hybrid fiber coaxial portion in communication with the output optical interface.

k(iii). The apparatus of claim e(iii), wherein the second control signal is received from an intelligent configuration unit disposed within the optical hub.

a(iv). An optical access network, comprising: an optical hub including at least one processor; a plurality of optical distribution centers connected to the optical hub by a plurality of optical fiber segments, respectively; a plurality of geographic fiber node serving areas, wherein each fiber node serving area of the plurality of fiber node serving areas includes at least one optical distribution center of the plurality of optical distribution centers; a plurality of end points, wherein each end point of the plurality of end points is in operable communication with at least one optical distribution center; and a point-to-point network provisioning system configured to (i) evaluate each potential communication path over the plurality of optical fiber segments between a first end point and a second end point, and (ii) select an optimum fiber path based on predetermined path selection criteria.

b(iv). The network of claim a(iv), wherein the point-to-point network provisioning system is disposed within the optical hub.

c(iv). The network of claim a(iv), wherein the first and second end points are disposed within the optical access network.

d(iv). The network of claim a(iv), wherein the first end point is disposed within the optical access network, and the second end point is disposed within a second access network including a second hub.

e(iv). The network of claim d(iv), wherein the optimum fiber path traverses at least one regional network between the optical access network and the second access network.

f(iv). The network of claim e(iv), wherein the optimum fiber path traverses at least one backbone network between the optical access network and the second access network.

g(iv). The network of claim f(iv), wherein at least one backbone network includes a primary backbone network and a secondary backbone network, and wherein the potential communication paths include at least one primary fiber path through the primary backbone network and at least one secondary fiber path through the secondary backbone network.

h(iv). The network of claim a(iv), wherein the point-to-point network provisioning system is further configured to select an optimum optical carrier to transmit along the optimum fiber path.

i(iv). The network of claim h(iv), wherein the point-to-point network provisioning system is further configured to transmit the selected optimum optical carrier along at least one fiber path containing a second optical carrier of a different carrier type than the selected optimum optical carrier.

j(iv). The network of claim a(iv), wherein the selected optimum optical carrier comprises a coherent signal transmission, and the second optical carrier comprises a non-coherent signal transmission.

k(iv). The network of claim a(iv), further comprising at least one database in operable communication with the point-to-point network provisioning system.

l(iv). The system of claim k(iv), wherein the at least one database is configured to index associations of all potential point-to-point communication links between different pairs of end points among the plurality of end points.

a(v). A method of provisioning point-to-point communications between two end points of a multi-end point optical network, comprising the steps of:
indexing all end points of the optical network;
defining each potential point-to-point connection between the indexed end points;
determining a topological fiber path for each defined point-to-point connection, wherein each topological fiber path includes one or more optical fiber segments;
calculating available transmission wavelengths for each of the one or more fiber segments;
selecting an optimum fiber path between the two end points based on the determined topological fiber path and the calculated available transmission wavelengths; and
provisioning a point-to-point communication link between the two end points along the selected optimum fiber path.

b(v). The method of claim a(v), wherein the step of determining comprises analyzing each topological fiber path against one or more network performance requirements.

c(v). The method of claim b(v), wherein the one or more network performance requirements include one or more of bandwidth parameters, latency parameters, and noise parameters.

d(v). The method of claim a(v), wherein the step of determining comprises analyzing each topological fiber path to further determine a set of all nodes crossed along the respective fiber path and the corresponding lengths of the one or more fiber segments traversed over the respective fiber path.

e(v). The method of claim d(v), further comprising a step of filtering out each topological fiber path that does not meet predetermined fiber path selection criteria.

f(v). The method of claim e(v), wherein the predetermined fiber path selection criteria include a redundancy requirement.

g(v). The method of claim f(v), further comprising a step of located a secondary path that corresponds to the selected optimum fiber path.

h(v). The method of claim g(v), wherein the optimum fiber path is selected based on a high degree of orthogonality with the corresponding secondary path.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical access network, comprising:
an optical hub including at least one processor;
a plurality of optical distribution centers connected to the optical hub by a plurality of optical fiber segments, respectively;
a plurality of geographic fiber node serving areas, wherein each fiber node serving area of the plurality of fiber node serving areas includes at least one optical distribution center of the plurality of optical distribution centers;
a plurality of end points, wherein each end point of the plurality of end points is in operable communication with at least one optical distribution center; and
a point-to-point network provisioning system configured to (i) evaluate each potential communication path over the plurality of optical fiber segments between a first end point and a second end point, (ii) select an optimum fiber path based on predetermined path selection criteria, (iii) select an optimum first optical carrier to transmit along the optimum fiber path, and (iv) transmit the selected optimum optical carrier along the optimum fiber path containing a second optical carrier of a different carrier type than the first optical carrier,
wherein the first optical carrier comprises a coherent signal transmission, and the second optical carrier comprises a non-coherent signal transmission.

2. The network of claim 1, wherein the point-to-point network provisioning system is disposed within the optical hub.

3. The network of claim 1, wherein the first and second end points are disposed within the optical access network.

4. The network of claim 1, wherein the first end point is disposed within the optical access network, and the second end point is disposed within a second access network including a second hub.

5. The network of claim 4, wherein the optimum fiber path traverses at least one regional network between the optical access network and the second access network.

6. The network of claim 5, wherein the optimum fiber path traverses at least one backbone network between the optical access network and the second access network.

7. The network of claim 6, wherein at least one backbone network includes a primary backbone network and a secondary backbone network, and wherein the potential communication paths include at least one primary fiber path through the primary backbone network and at least one secondary fiber path through the secondary backbone network.

8. The network of claim 1, further comprising at least one database in operable communication with the point-to-point network provisioning system.

9. The system of claim 8, wherein the at least one database is configured to index associations of all potential point-to-point communication links between different pairs of end points among the plurality of end points.

10. A method of provisioning point-to-point communications between two end points of a multi-end point optical network, comprising the steps of:
indexing all end points of the optical network;
defining each potential point-to-point connection between the indexed end points;
determining a topological fiber path for each defined point-to-point connection, wherein each topological fiber path includes one or more optical fiber segments;
calculating (i) available transmission wavelengths for each of the one or more fiber segments, (ii) cost factor as a function of bandwidth for each of the available transmission wavelengths, and (iii) allowable aggregate optical power for each of the one or more fiber segments;
selecting an optimum fiber path between the two end points based on the determined topological fiber path and the step of calculating; and
provisioning a point-to-point communication link between the two end points along the selected optimum fiber path.

11. The method of claim 10, wherein the step of determining comprises analyzing each topological fiber path against one or more network performance requirements.

12. The method of claim 11, wherein the one or more network performance requirements include one or more of bandwidth parameters, latency parameters, and noise parameters.

13. The method of claim 10, wherein the step of determining comprises analyzing each topological fiber path to further determine a set of all nodes crossed along the respective fiber path and the corresponding lengths of the one or more fiber segments traversed over the respective fiber path.

14. The method of claim 13, further comprising a step of filtering out each topological fiber path that does not meet predetermined fiber path selection criteria.

15. The method of claim 14, wherein the predetermined fiber path selection criteria include a redundancy requirement.

16. The method of claim 15, further comprising a step of located a secondary path that corresponds to the selected optimum fiber path.

17. The method of claim 16, wherein the optimum fiber path is selected based on a high degree of orthogonality with the corresponding secondary path.

18. The network of claim 1, wherein the point-to-point network provisioning system is further configured to select the optimum fiber path based on an impact of the optical power of the second optical carrier on the first optical carrier.

19. The method of claim 14, wherein a peak power of a particular segment of the one or more fiber segments is greater than the allowable aggregate optical power of the particular segment, and wherein the step of calculating further comprises adding to the cost factor of the particular fiber segment for the amount of the peak power greater than the allowable aggregate optical power.

20. The method of claim 10, wherein a first wavelength of the available transmission wavelengths comprises a coherent signal transmission, and a second wavelength of the available transmission wavelengths comprises a non-coherent signal transmission.

* * * * *